US011869208B2

(12) United States Patent
Lu et al.

(10) Patent No.: US 11,869,208 B2
(45) Date of Patent: Jan. 9, 2024

(54) METHODS, APPARATUSES, AND COMPUTER PROGRAMS FOR PROCESSING PULMONARY VEIN COMPUTED TOMOGRAPHY IMAGES

(71) Applicants: TAIPEI VETERANS GENERAL HOSPITAL, Taipei (TW); National Yang Ming Chiao Tung University, Hsinchu (TW)

(72) Inventors: Horng-Shing Lu, Hsinchu (TW); Chih-Min Liu, Taipei (TW); Shih-Lin Chang, Taipei (TW); Shih-Ann Chen, Taipei (TW); Yenn-Jiang Lin, Taipei (TW); Hung-Hsun Chen, Hsinchu (TW); Wei-Shiang Chen, Hsinchu (TW)

(73) Assignees: TAIPEI VETERANS GENERAL HOSPITAL, Taipei (TW); National Yang Ming Chiao Tung University, Hsinchu (TW)

( * ) Notice: Subject to any disclaimer, the term of this patent is extended or adjusted under 35 U.S.C. 154(b) by 311 days.

(21) Appl. No.: 17/201,167

(22) Filed: Mar. 15, 2021

(65) Prior Publication Data

US 2021/0287365 A1    Sep. 16, 2021

Related U.S. Application Data

(60) Provisional application No. 62/990,254, filed on Mar. 16, 2020.

(51) Int. Cl.
G06N 3/045     (2023.01)
G06T 7/70      (2017.01)
(Continued)

(52) U.S. Cl.
CPC .............. *G06T 7/70* (2017.01); *G06N 3/045* (2023.01); *G06T 7/0012* (2013.01);
(Continued)

(58) Field of Classification Search
None
See application file for complete search history.

(56) References Cited

U.S. PATENT DOCUMENTS 6,012,457 A *   1/2000   Lesh .................. A61M 25/1002
                                                           601/2
8,265,752 B2 *  9/2012   Armoundas ....... A61B 5/02405
                                                           607/9
(Continued)

FOREIGN PATENT DOCUMENTS

CN   107145702 A *   9/2017   ............... A61B 5/00
EP   3686899 A1 *    7/2020   ........... A61B 5/0044

OTHER PUBLICATIONS

Chen, Hung-Hsun et al. "Automated Extraction of Left Atrial Volumes from Two-dimensional Computer Tomography Images Using a Deep Learning Technique" International Journal of Cardiology 316, Apr. 2020 (41 pages).
(Continued)

*Primary Examiner* — Tsung Yin Tsai
(74) *Attorney, Agent, or Firm* — Osha Bergman Watanabe & Burton LLP

(57) ABSTRACT

The present disclosure relates to methods, apparatuses, and computer programs for processing computed tomography images. Precise segmentation of the left atrium (LA) in computed tomography (CT) images constitutes a crucial preparatory step for catheter ablation in atrial fibrillation (AF). We aim to apply deep convolutional neural networks (DCNNs) to automate the LA detection/segmentation procedure and create a three-dimensional (3D) geometries. The deep learning provides an efficient and accurate way for
(Continued)

automatic contouring and LA volume calculation based on the construction of the 3D LA geometry. Non-pulmonary vein (NPV) trigger has been reported as an important predictor of recurrence post atrial fibrillation (AF) ablation. Elimination of NPV triggers can reduce the post-ablation AF recurrence. The deep learning was applied in pre-ablation pulmonary vein computed tomography (PVCT) geometric slices to create a prediction model for NPV triggers in patients with paroxysmal atrial fibrillation (PAF). The deep learning model using pre-ablation PVCT can be applied to predict the trigger origins in PAF patients receiving catheter ablation. The application of this model may identify patients with a high risk of NPV trigger before ablation.

18 Claims, 14 Drawing Sheets

(51) Int. Cl.
  *G06T 7/00* (2017.01)
  *G06V 10/764* (2022.01)
  *G06V 10/774* (2022.01)
(52) U.S. Cl.
  CPC .......... *G06V 10/764* (2022.01); *G06V 10/774* (2022.01); *G06T 2207/10072* (2013.01); *G06T 2207/20024* (2013.01); *G06T 2207/20076* (2013.01); *G06T 2207/20081* (2013.01); *G06T 2207/20084* (2013.01); *G06T 2207/30048* (2013.01)

(56) References Cited

U.S. PATENT DOCUMENTS

| | | | |
|---|---|---|---|
| 9,408,576 B2* | 8/2016 | Chon | A61B 5/6898 |
| 9,968,257 B1* | 5/2018 | Burt | A61B 5/0035 |
| 10,395,366 B2* | 8/2019 | Isgum | G06V 20/653 |
| 10,910,094 B2* | 2/2021 | Hartung | A61B 6/032 |
| 2010/0042172 A1* | 2/2010 | Armoundas | A61B 5/364 604/503 |
| 2014/0107519 A1* | 4/2014 | Musha | A61B 5/374 600/544 |
| 2014/0330134 A1* | 11/2014 | Chon | A61B 5/361 600/479 |
| 2016/0379363 A1* | 12/2016 | Kitamura | A61B 1/0005 600/371 |
| 2019/0139219 A1* | 5/2019 | Isgum | G16H 50/50 |
| 2019/0164642 A1* | 5/2019 | Hartung | G06N 3/045 |
| 2019/0370972 A1* | 12/2019 | Bagci | G06T 7/0012 |
| 2020/0107818 A1* | 4/2020 | Keshet | A61B 8/0883 |
| 2020/0205745 A1* | 7/2020 | Khosousi | G06N 20/00 |
| 2020/0242451 A1* | 7/2020 | Cao | G06N 3/048 |
| 2021/0106281 A1* | 4/2021 | Tran | A61B 5/486 |
| 2021/0369174 A1* | 12/2021 | Ravuna | A61B 5/346 |

OTHER PUBLICATIONS

Liu, Chih-Min et al. "The Clinical Application of the Deep Learning Technique for Predicting Trigger Origins in Paroxysmal Atrial Fibrillation Patients with Catheter Ablation" Circulation: Arrhythmia and Electrophysiology, Oct. 2020 (39 pages).

* cited by examiner

METHODS, APPARATUSES, AND COMPUTER PROGRAMS FOR PROCESSING PULMONARY VEIN COMPUTED TOMOGRAPHY IMAGES

TECHNICAL FIELD

The present disclosure relates to processing computed tomography images. More particularly, the present disclosure relates to methods, apparatuses, and computer programs for processing pulmonary vein computed tomography images. The present disclosure also relates to clinical applications of deep learning techniques in the prediction of trigger origin in paroxysmal atrial fibrillation patients.

BACKGROUND

Atrial fibrillation (AF) may be divided into three types based on the duration: paroxysmal atrial fibrillation, persistent atrial fibrillation, and permanent atrial fibrillation. Paroxysmal atrial fibrillation may occur when there are abnormal electric pathways in the heart and the heart is not beating regularly or pumping enough oxygen-rich blood around the body. In some cases, paroxysmal atrial fibrillation may be caused by abnormal rapid electric activities around the pulmonary vein. However, other thoracic veins or atrial tissues may also cause abnormal rapid electrical activity and cause atrial fibrillation. A catheter ablation procedure may be a clinical treatment for atrial fibrillation.

As a treatment for atrial fibrillation, a catheter ablation procedure may be performed on the trigger origins of the paroxysmal atrial fibrillation. Before performing catheter ablation procedure on a patient, an invasive electrophysiological examination may be performed to determine the trigger origins. A method, an apparatus, or a computer program facilitating the physician to determine or predict the trigger origins of atrial fibrillation is highly considered.

SUMMARY OF THE APPLICATION

Some embodiments of the present disclosure at least provide a technical solution for processing PVCT images.

Some embodiments of the present disclosure provide a method for processing pulmonary vein computed tomography (PVCT) images. The method may include: obtaining a plurality of input images from the upper border of a left atrium to the bottom of a heart; determine whether each of the plurality of input images relates to a non-pulmonary vein (NPV) trigger origin; and determining the plurality of input images relating to a NPV trigger origin when more than half of the plurality of input images are determined relating to a NPV trigger origin.

Some other embodiments of the present disclosure provide a device for processing pulmonary vein computed tomography (PVCT) images. The device may include: a processor; and a memory, which stores instructions causing the processor to perform operations. The operations may comprise: inputting a plurality of input images from the upper border of a left atrium to the bottom of a heart; determine whether each of the plurality of input images relates to a non-pulmonary vein (NPV) trigger origin; determining the plurality of input images relating to a NPV trigger origin when more than half of the plurality of input images are determined relating to a NPV trigger origin; and outputting an output indicating the plurality of input images relating to a NPV trigger origin.

Some other embodiments of the present disclosure provide a non-transitory, computer-readable storage medium storing computer programmable instructions. The computer programmable instructions may cause a computer to perform operations. The operations may comprise: inputting a plurality of input images from the upper border of a left atrium to the bottom of a heart; determine whether each of the plurality of input images relates to a non-pulmonary vein (NPV) trigger origin; determining the plurality of input images relating to a NPV trigger origin when more than half of the plurality of input images are determined relating to a NPV trigger origin; and outputting an output indicating the plurality of input images relating to a NPV trigger origin.

BRIEF DESCRIPTION OF THE DRAWINGS

For a better understanding of the nature and objects of some embodiments of the present disclosure, reference should be made to the following detailed description taken in conjunction with the accompanying drawings. In the drawings, identical or functionally identical elements are given the same reference numbers unless otherwise specified.

DETAILED DESCRIPTION

Figure 1:
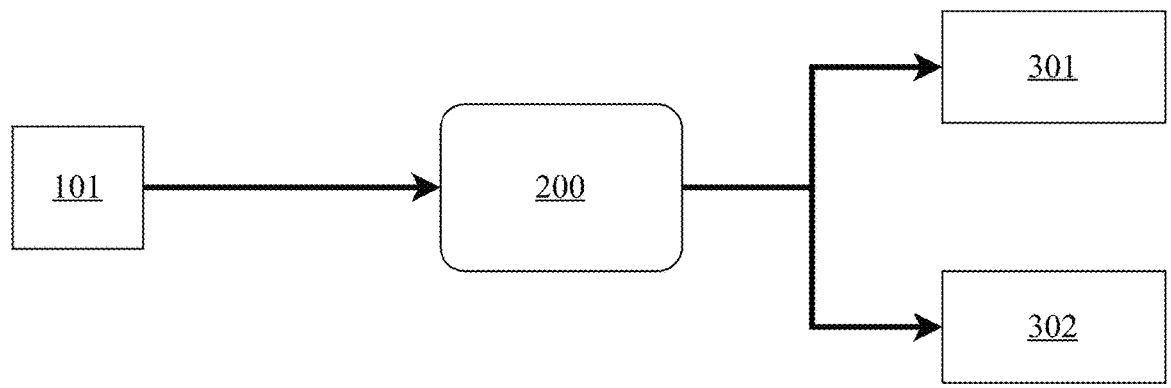
FIG. 1 illustrates a flowchart of an image processing method according to some embodiments of the present disclosure.

The following disclosure provides many different embodiments or examples for implementing different features of the provided subject matter. Specific examples of components and arrangements are described below. Certainly, these descriptions are merely examples and are not intended to be limiting. In the present disclosure, in the following descriptions, the description of the first feature being formed on or above the second feature may include an embodiment formed by direct contact between the first feature and the second feature, and may further include an embodiment in which an additional feature may be formed between the first feature and the second feature to enable the first feature and the second feature to be not in direct contact. In addition, in the present disclosure, reference numerals and/or letters may be repeated in examples. This repetition is for the purpose of simplification and clarity, and does not indicate a relationship between the described various embodiments and/or configurations.

The embodiments of the present disclosure are described in detail below. However, it should be understood that many applicable concepts provided by the present disclosure may be implemented in a plurality of specific environments. The described specific embodiments are only illustrative and do not limit the scope of the present invention.

FIG. 1 illustrates a flow chart of an image processing method according to some embodiments of the present disclosure. Image processing procedure 200 may obtain an input image 101. After the operations of the image processing procedure 200, two outputs 301 and 302 may be generated. In some embodiments, the input image 101 may be a computed tomography (CT) image. The input image may be a pulmonary vein CT image.

In some embodiments, each of the outputs 301 and 302 may be a value. Each of the outputs 301 and 302 may be a probability value. The sum of the outputs 301 and 302 may equal to 1. In some embodiments, one of the outputs 301 and 302 may indicate the probability that the input image 101 relates to (or include) a non-pulmonary vein (NPV) trigger origin; the other of the outputs 301 and 302 may indicate the probability that the input image 101 relates to (or include) a pulmonary vein (PV) trigger origin. In some embodiments, when the probability that input image 101 relating to a NPV trigger origin is greater than 0.5, the input image 101 may be determined as relating a NPV trigger origin.

Figure 2:
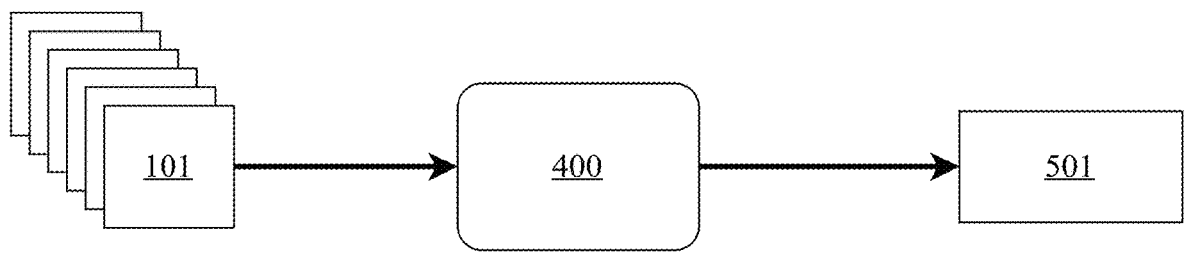
FIG. 2 illustrates a flowchart of an image processing method according to some embodiments of the present disclosure.

FIG. 2 illustrates a flow chart of an image processing method according to some embodiments of the present disclosure. Image processing procedure 400 may obtain a plurality of input images 101. After the operations of the image processing procedure 400, output 501 may be generated. The input image 101 may be a computed tomography image or a pulmonary vein CT image. The plurality of input image 101 may be the pulmonary vein CT images obtained from one patient. The plurality of input image 101 may be the pulmonary vein CT images obtained from the upper border of the left atrium to the bottom of the heart.

The image processing procedure 400 may include one or more image processing procedure 200. Each of the plurality of input images 101 may be processed with an image processing procedure 200. Each of the plurality of input images 101 may be determined whether it relates to a NPV trigger origin. When more than half of the plurality of input images 101 are determined as relating to a NPV trigger origin, the plurality of input images 101 may be determined as relating to at least one NPV trigger origin. When less than half of the plurality of input images 101 are determined as relating to a NPV trigger origin, the plurality of input images 101 may not be determined as relating to at least one NPV trigger origin.

In some embodiments, when more than half of the plurality of input images 101 are determined as relating to a NPV trigger origin, the corresponding patient may be determined having atrial fibrillation relating to NPV trigger origin. When less than half of the plurality of input images 101 are determined as relating to a NPV trigger origin, the corresponding patient may not be determined having atrial fibrillation relating to NPV trigger origin.

The output 501 generated by the image processing procedure 400 may be a value indicating whether the plurality of input images 101 is determined as relating to at least one NPV trigger origin. For example, when the output 501 equals to 1, the plurality of input images 101 may be determined as relating to at least one NPV trigger origin. When the output 501 equals to 0, the plurality of input images 101 may be determined as relating to at least one PV trigger origin.

In some embodiments, when the output 501 equals to 1, the corresponding patient may be determined having atrial fibrillation relating to NPV trigger origin. When the output 501 equals to 0, the corresponding patient may not be determined having atrial fibrillation relating to NPV trigger origin.

Figure 3:
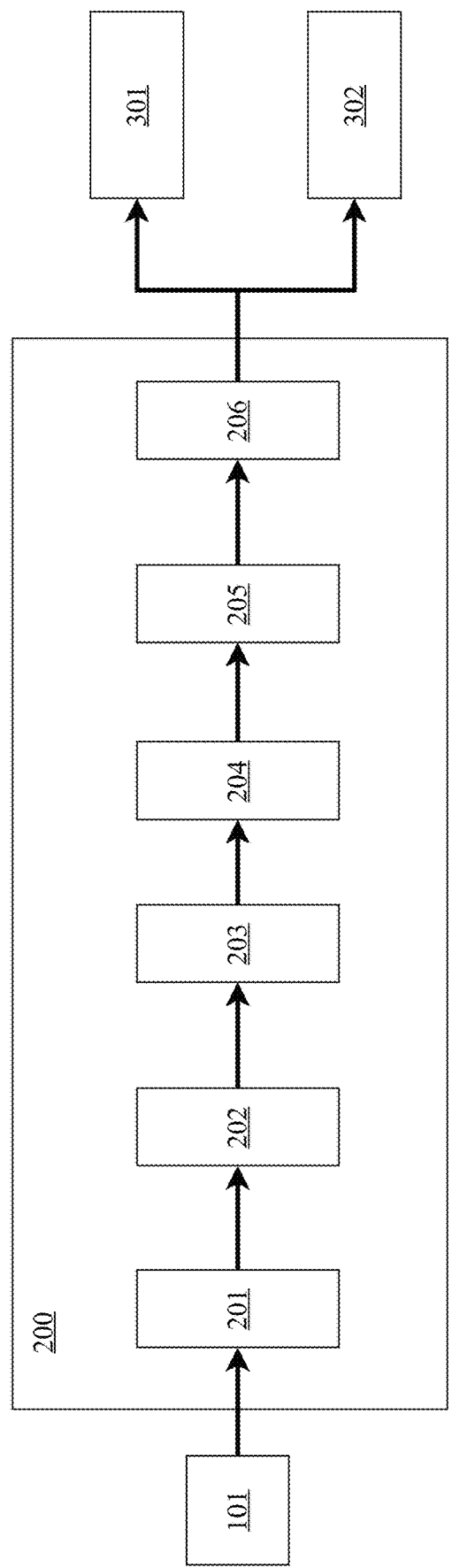
FIG. 3 illustrates a flowchart of an image processing method according to some embodiments of the present disclosure.

FIG. 3 illustrate a flowchart of an image processing method according to some embodiments of the present disclosure. Image processing procedure 200 may include one or more operations. In some embodiments, the image processing procedure 200 may include operations 201 to 206 shown in FIG. 3.

In FIG. 3, the image processing procedure 200 may obtain an input image 101. The input image 101 may be input to the operation 201. In operation 201, a convolution operation may be performed with the input image 101 and a convolution layer (e.g., an input layer). The operation 201 may include a zero-padding operation, a batch normalization, or a rectified linear unit (ReLU) operation.

In operation 201, the convolution layer may include a 7*7 filter; the filter of the convolution layer may include one or more channels. For example, a 7*7 filter having 7 channels may include 7*7*7 values used for a convolution operation. Such 7*7*7 values may be determined by a training method of machine learning, e.g., a back-propagation algorithm of a convolution neural network.

After operation 201, a feature map may be generated. The feature map may include one or more channels. The number of the channels of the generated feature map may be determined in accordance with the number of the channels of the convolution layer.

The feature map generated from the operation 201 may be input to the operation 202. In operation 202, one or more convolution operations may be performed the input feature map and one or more convolution layers. In some embodiments, the operation 202 may include 6 convolution layers, and 6 convolution operations may be performed the input feature map and 6 convolution layers. The operation 202 may include a batch normalization, or a rectified linear unit (ReLU) operation.

In operation 202, each convolution layer may include a 3*3 filter having 64 channels. For example, a 3*3 filter having 64 channels in a convolution layer may include 3*3*64 values used for a convolution operation. Such 3*3*64 values in each convolution layer may be determined by a training method of machine learning, e.g., a back-propagation algorithm of a convolution neural network. After operation 202, a feature map may be generated. The feature map may include one or more channels, e.g., 64 channels.

The feature map generated from the operation 202 may be input to the operation 203. In operation 203, one or more convolution operations may be performed the input feature map and one or more convolution layers. In some embodiments, the operation 203 may include 8 convolution layers, and 8 convolution operations may be performed the input feature map and 8 convolution layers. The operation 203 may include a batch normalization, or a rectified linear unit (ReLU) operation.

In operation 203, each convolution layer may include a 3*3 filter having 128 channels. For example, a 3*3 filter having 128 channels in a convolution layer may include 3*3*128 values used for a convolution operation. Such 3*3*128 values in each convolution layer may be determined by a training method of machine learning, e.g., a back-propagation algorithm of a convolution neural network. After operation 203, a feature map may be generated. The feature map may include one or more channels, e.g., 128 channels.

The feature map generated from the operation 203 may be input to the operation 204. In operation 204, one or more convolution operations may be performed the input feature map and one or more convolution layers. In some embodiments, the operation 204 may include 12 convolution layers, and 12 convolution operations may be performed the input feature map and 12 convolution layers. The operation 204 may include a batch normalization, or a rectified linear unit (ReLU) operation.

In operation 204, each convolution layer may include a 3*3 filter having 256 channels. For example, a 3*3 filter having 256 channels in a convolution layer may include 3*3*256 values used for a convolution operation. Such 3*3*256 values in each convolution layer may be determined by a training method of machine learning, e.g., a back-propagation algorithm of a convolution neural network. After operation 204, a feature map may be generated. The feature map may include one or more channels, e.g., 256 channels.

The feature map generated from the operation 204 may be input to the operation 205. In operation 205, one or more convolution operations may be performed the input feature map and one or more convolution layers. In some embodiments, the operation 205 may include 6 convolution layers, and 6 convolution operations may be performed the input feature map and 6 convolution layers. The operation 205 may include a batch normalization, or a rectified linear unit (ReLU) operation.

In operation 205, each convolution layer may include a 3*3 filter having 512 channels. For example, a 3*3 filter having 512 channels in a convolution layer may include 3*3*512 values used for a convolution operation. Such 3*3*512 values in each convolution layer may be determined by a training method of machine learning, e.g., a back-propagation algorithm of a convolution neural network. After operation 205, a feature map may be generated. The feature map may include one or more channels, e.g., 512 channels.

A low-level feature map may indicate a feature map generated with few convolution operations. The feature map generated by the operation 201 may be a low-level feature map. The low-level feature map may include the image features like edges, corners, or pattern of an object.

A high-level feature map may indicate a feature map generated with much convolution operations. The feature map generated by the operation 205 may be a high-level feature map. The high-level feature map may be main bases for identifying a desired object in an image.

In some embodiments, the feature map generated by the operation 201 (e.g., a low-level feature map) and the feature map generated by the operation 205 (e.g., a high-level feature map) may be added or summed. The addition or sum of the low-level feature map and the high-level feature map may decrease the data loss in high frequency. The addition or sum of the low-level feature map and the high-level feature map may emphasize the contrast and details of the output feature map. The addition or sum of the low-level feature map and the high-level feature map may achieve better distinction between different tissues or structures.

The addition or sum of the low-level feature map and the high-level feature map may be input to the operation 206. Operation 206 may include a binary output layer and a SoftMax layer, and operations may be performed with the input feature map and a binary output layer and a SoftMax layer.

The output of operation 206 (or the output of image processing procedure 200) may include outputs 301 and 302. Each of the outputs 301 and 302 may be a probability value. The sum of the outputs 301 and 302 may equal to 1. In some embodiments, one of the outputs 301 and 302 may indicate the probability that the input image 101 relates to a non-pulmonary vein (NPV) trigger origin; the other of the outputs 301 and 302 may indicate the probability that the input image 101 relates to a pulmonary vein (PV) trigger origin. In some embodiments, when the probability that input image 101 relates to a NPV trigger origin is greater than 0.5, the input image 101 may be determined as relating to a NPV trigger origin.

In some embodiments of the present disclosure, the image processing procedure 200 may be a convolution neural network fixed by the pre-train model and update a convolution neural network's weight by the back-propagation algorithm. Operations to process the training data set for training the convolution neural network may be illustrated in FIG. 4.

In operation 401, the images of 521 paroxysmal atrial fibrillation (AF) patients are obtained. The images of the 521 patients are the eligible PVCT images. The images of the 521 patients are obtained before performing ablation (e.g., catheter ablation).

In operation 402, the images of 163 patients are discarded from the images of the 521 patients. Atrial fibrillation recurrence occurs to the 163 patients after performing ablation. In some embodiments, the atrial fibrillation recurrence may occur to the 163 patients within a predetermined time period (e.g., 1 year) from the date of performing ablation.

In operation 403, 23683 images of 358 patients are included to train the prediction module or the convolution neural network. The 23683 images are the eligible PVCT images. The 23683 images are obtained before performing ablation. In some embodiments, no atrial fibrillation recurrence occurs to the 358 patients within a predetermined time period (e.g., 1 year) from the date of performing ablation. This may indicate that ablation is helpful for the 358 patients.

In operation 404, a portion of the 358 patients are divided. 298 patients are divided from the 358 patients. The 298 patients may be with only PV trigger origins. The 298 patients may relate to only PV trigger origins.

In operation 405, a portion of the 358 patients are divided. 60 patients are divided from the 358 patients. The 60 patients may be with NPV trigger origins. The 60 patients may relate to NPV trigger origins.

In operation 406, a portion of the 358 patients are divided as a training set. 290 patients are divided from the 358 patients as a training set. The 290 patients include some patients relating to only PV trigger origins and some patients relating to NPV trigger origins. The ratio of the patients relating to only PV trigger origins to the patients relating to NPV trigger origins may be predetermined or random. 17340 images are obtained from the 290 patients. The 17340 images corresponding to the 290 patients are used as a training set to train the prediction module or the convolution neural network.

In operation 407, a portion of the 358 patients are divided as an internal validation set. 33 patients are divided from the 358 patients as a validation set. The 33 patients include some patients relating to only PV trigger origins and some patients relating to NPV trigger origins. The ratio of the patients relating to only PV trigger origins to the patients relating to NPV trigger origins may be predetermined or random. 3491 images are obtained from the 33 patients. The 3491 images corresponding to the 33 patients are used as an internal validation set to validate whether the prediction module or the convolution neural network is convergent, overfitting, underfitting, or stable. Some hyperparameter of the prediction module or the convolution neural network may be adjusted according to the validation result.

In operation 408, a portion of the 358 patients are divided as a test set. 35 patients are divided from the 358 patients as a test set. The 35 patients include some patients relating to only PV trigger origins and some patients relating to NPV trigger origins. The ratio of the patients relating to only PV trigger origins to the patients relating to NPV trigger origins may be predetermined or random. 2852 images are obtained from the 35 patients. The 2852 images corresponding to the 35 patients are used as a test set to test the result of the prediction module or the convolution neural network. The test results may be discussed in FIGS. 5A to 6B.

Through the image processing procedure 200 (as shown in FIG. 1 or 3) or the processing procedure 400 (as shown in FIG. 2) of the present disclosure, the outcomes may be categorized into true positive (TP) type, true negative (TN) type, false positive (FP) type, and false negative (FN) type. Based on the four types of outcome, the, the quantitative indicators for evaluating the results of machine learning include the following:

Accuracy=(TP+TN)/(TP+FP+FN+TN);

Precision=TP/(TP+FP), e.g., indicating the proportion of positive outcomes that are correctly identified;

Recall=TP/(TP+FN), e.g., indicating the proportion of actually positive cases that are correctly identified;

F1 score=2/((1/Precision)+(1/Recall)), e.g., a harmonic mean of the accuracy and the recall;

Sensitivity=TP/(TP+FN), same as the recall;

Specificity=TN/(FP+TN), indicating the proportion of actually negative cases that are correctly identified.

Through the image processing procedure 200 (as shown in FIG. 1 or 3) of the present disclosure, a TP outcome may indicate that an image relating to a NPV trigger origin is determined or predicted as relating a NPV trigger origin. A TN outcome may indicate that an image relating to a PV trigger origin is determined or predicted as relating a PV trigger origin. A FP outcome may indicate that an image relating to a PV trigger origin is determined or predicted as relating a NPV trigger origin. A FN outcome may indicate that an image relating to a NPV trigger origin is determined or predicted as relating a PV trigger origin. Through the image processing procedure 200 of the present disclosure, the accuracy indicates the rate (or probability) that an image is correctly predicted or determined. The sensitivity indicates the rate (or probability) that an image relating to a NPV trigger origin is correctly determined or predicted. The specificity indicates the rate (or probability) that an image relating to a PV trigger origin is correctly determined or predicted.

Through the image processing procedure 400 (as shown in FIG. 2) of the present disclosure, a TP outcome may indicate that a plurality of images from a patient relating to a NPV trigger origin is determined or predicted as relating a NPV trigger origin. A TN outcome may indicate that a plurality of images from a patient relating to a PV trigger origin is determined or predicted as relating a PV trigger origin. A FP outcome may indicate that a plurality of images from a patient relating to a PV trigger origin is determined or predicted as relating a NPV trigger origin. A FN outcome may indicate that a plurality of images from a patient relating to a NPV trigger origin is determined or predicted as relating a PV trigger origin. Through the image processing procedure 400 of the present disclosure, the accuracy indicates the rate (or probability) that a plurality of images from a patient is correctly predicted or determined. The sensitivity indicates the rate (or probability) that a plurality of images from a patient as relating to a NPV trigger origin is correctly predicted or determined. The specificity indicates the rate (or probability) that a plurality of images from a patient as relating to a PV trigger origin is correctly predicted or determined.

In this case, for each image (e.g., a PVCT image), the accuracy is 82.4±2.0%, the sensitivity is 64.3±5.4%, and the specificity is 88.4±1.9%. In this case, for each set of images from a patient (e.g., a set of PVCT images), the accuracy is 88.6±2.3%, the sensitivity is 75.0±5.8%, and the specificity is 95.7±1.8%.

Figure 4:
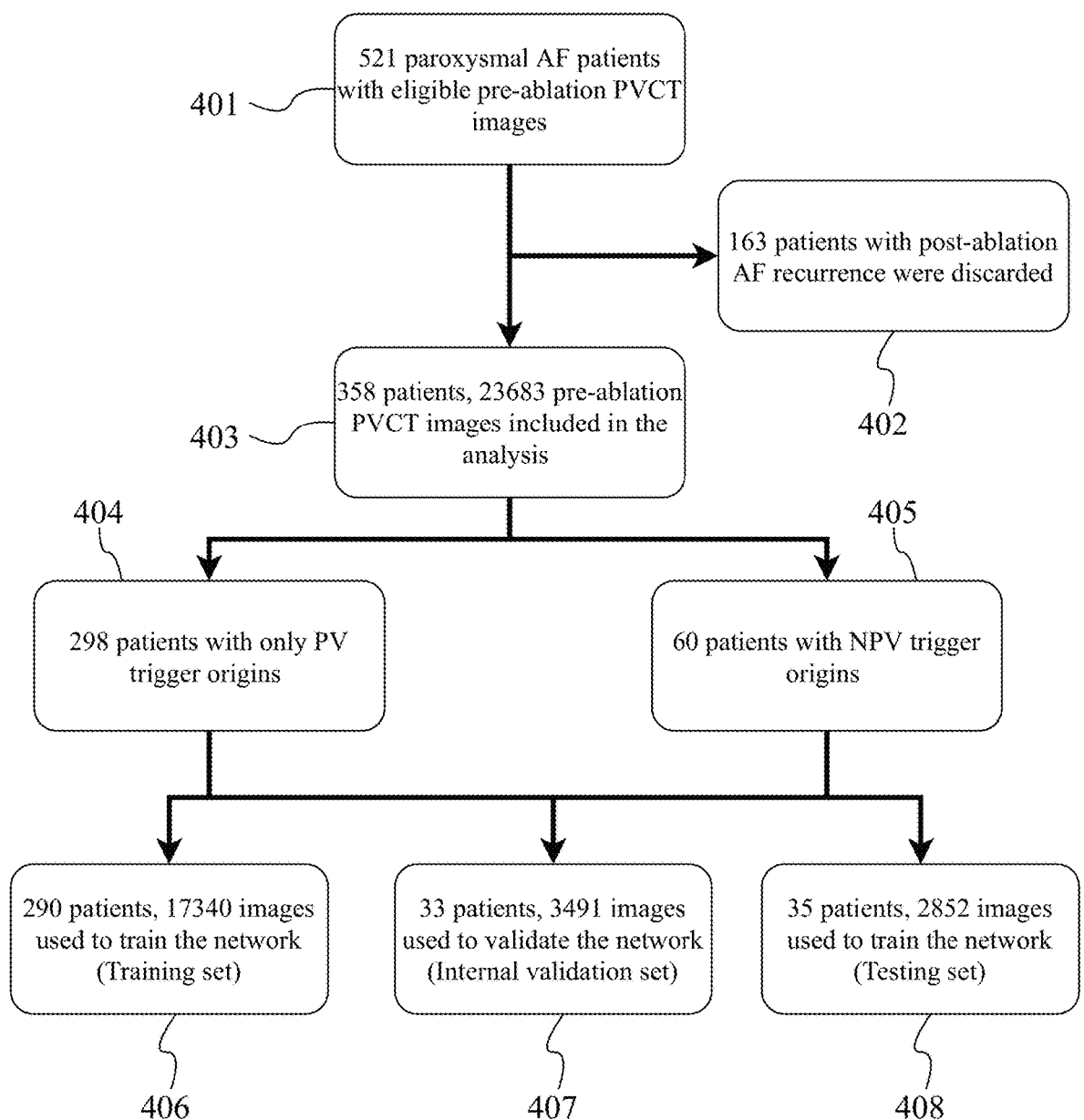
FIG. 4 illustrates a flowchart of a data processing method according to some embodiments of the present disclosure.

The numbers of paroxysmal AF patients and the number of images shown in FIG. 4 may be changed depending on the pre-train model used, the resolution of images, the setting of hyper-parameters, the number of images, etc., and thus are not limited to the above embodiments.

Figure 5B:
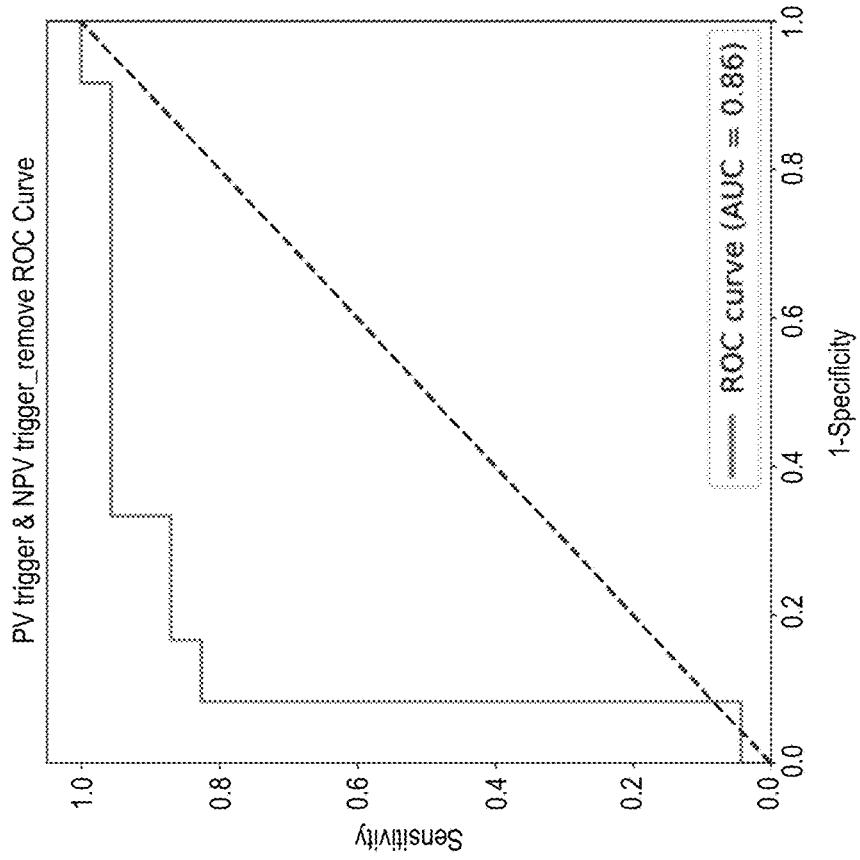
FIGS. 5A and 5B illustrate the ROC curves of the results according to some embodiments of the present disclosure.
Figure 5A:
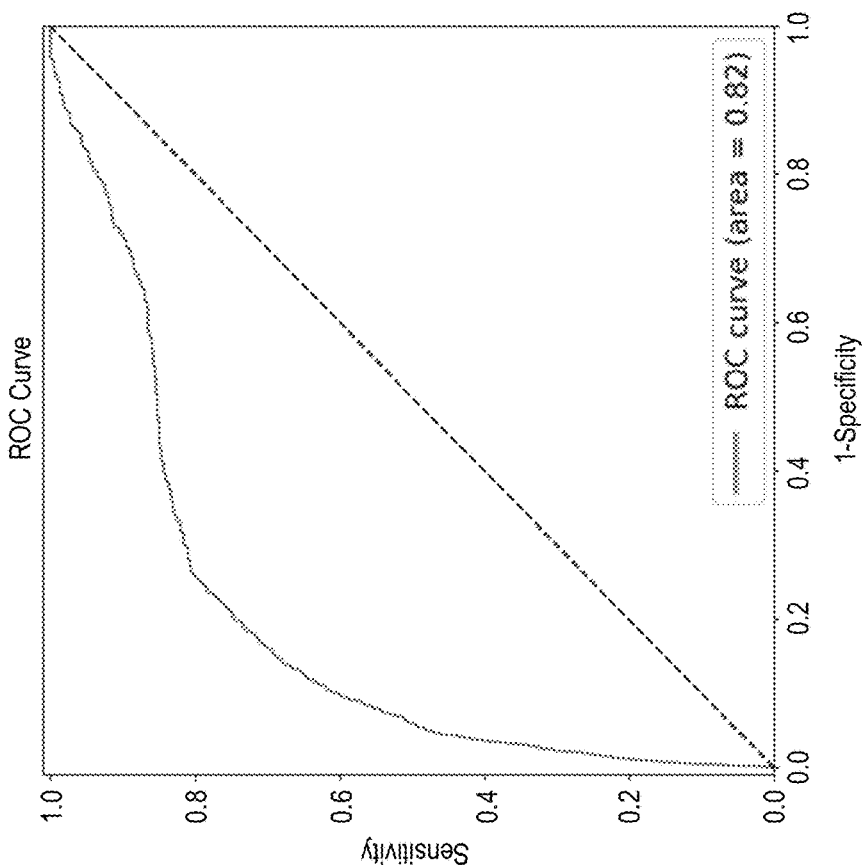

FIGS. 5A and 5B illustrate the receiver operating characteristic (ROC) curves according to some embodiments of the present disclosure. FIG. 5A illustrate the ROC curve for each image (e.g., each PVCT image) through the image processing procedure 200. FIG. 5A illustrate the ROC curve for each patient through the image processing procedure 400.

The dash line in FIG. 5A indicates the result of randomly guessing whether each image relates to NPV trigger origin or PV trigger origin. The dash line in FIG. 5B indicates the result of randomly guessing whether each patient relates to NPV trigger origin or PV trigger origin. The solid line in FIG. 5A may indicate the ROC curve of image processing procedure 200. The solid line in FIG. 5B may indicate the ROC curve of image processing procedure 400. Since both the ROC curves of the image processing procedure 200 and 400 are disposed above the dash line, the determination or prediction results of the image processing procedure 200 and 400 are much better than random guesses.

If the area under the curve (AUC) equals 0.5 (e.g., the area under the dash line of FIG. 5A or 5B), the determination or prediction equals random guess. If the AUC is greater than 0.5, the determination or prediction is better than a random guess. If the AUC is lower than 0.5, the determination or prediction is worse than a random guess. If the AUC equals 1, the determination or prediction is perfect (i.e., all determinations or predictions are correct). In FIG. 5A, the AUC equals 0.82f0.01. In FIG. 5B, the AUC equals 0.88f0.07. The determination or prediction results of the image processing procedure 200 and 400 are much better than random guesses.

Figure 6B:
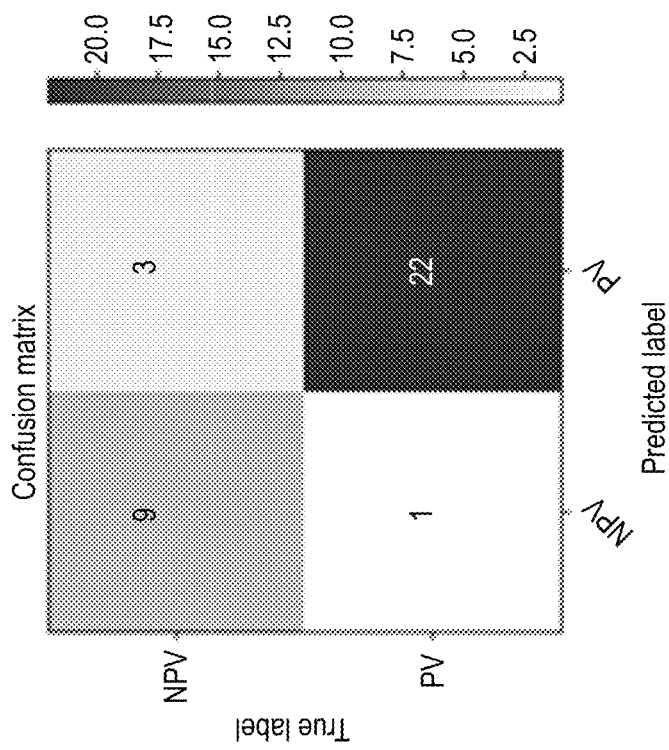
FIGS. 6A and 6B illustrate the confusion matrices of the results according to some embodiments of the present disclosure.
Figure 6A:
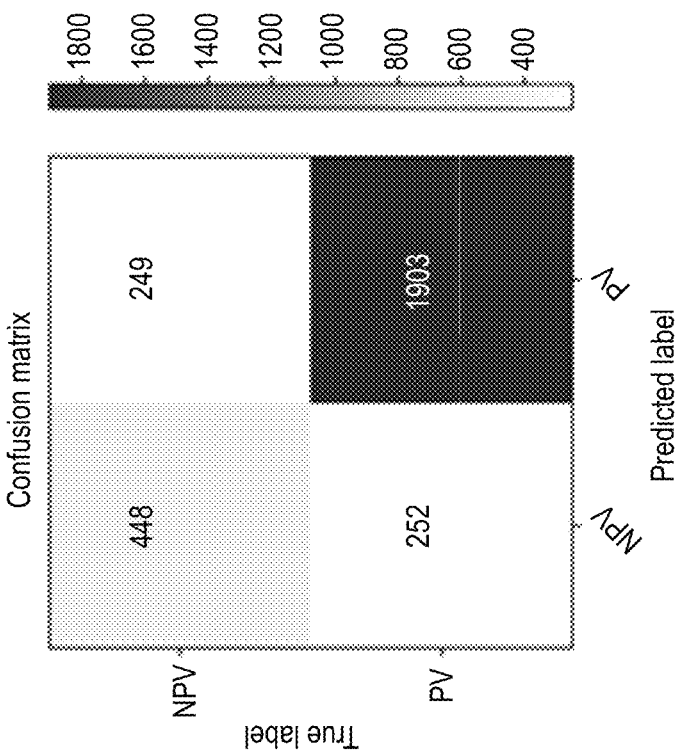

FIGS. 6A and 6B illustrate the confusion matrices according to some embodiments of the present disclosure. FIG. 6A illustrates the confusion matrix of test results in images (e.g., PVCT images). FIG. 6A illustrates the confusion matrix of test results of image processing procedure 200. FIG. 6B illustrates the confusion matrix of test results in all tested patients. FIG. 6B illustrates the confusion matrix of test results of image processing procedure 400.

In FIG. 6A, the y-axis indicates the actual trigger origin to which an image relates, including two values: NPV trigger origin and PV trigger origin. The x-axis indicates the predicted (or determined) trigger origin to which an image relates, including two values: NPV trigger origin and PV trigger origin. The square with darker color indicates more cases. For example, the number shown in the left upper square (i.e., 448) indicates the cases that an image actually relating to NPV trigger origin is predicted or determined as relating to NPV trigger origin. The number shown in the left lower square (i.e., 252) indicates the cases that an image actually relating to PV trigger origin is predicted or determined as relating to NPV trigger origin. The color in the left upper square is darker than that in the left lower square because the cases in the left upper square is more than that in the left lower square. The left upper square and the right lower have much darker color than other squares. This may indicate that the accuracy of the test results in images (through image processing procedure 200) is high.

In FIG. 6B, the y-axis indicates the actual trigger origin to which a patient relates, including two values: NPV trigger origin and PV trigger origin. The x-axis indicates the predicted (or determined) trigger origin to which a patient relates, including two values: NPV trigger origin and PV trigger origin. The square with darker color indicates more cases. For example, the number shown in the left upper square (i.e., 9) indicates the cases that a patient actually relating to NPV trigger origin is predicted or determined as relating to NPV trigger origin. The number shown in the left lower square (i.e., 1) indicates the cases that a patient actually relating to PV trigger origin is predicted or determined as relating to NPV trigger origin. The color in the left upper square is darker than that in the left lower square because the cases in the left upper square is more than that in the left lower square. The left upper square and the right lower have much darker color than other squares. This may indicate that the accuracy of the test results in patients (through image processing procedure 400) is high.

Figure 7:
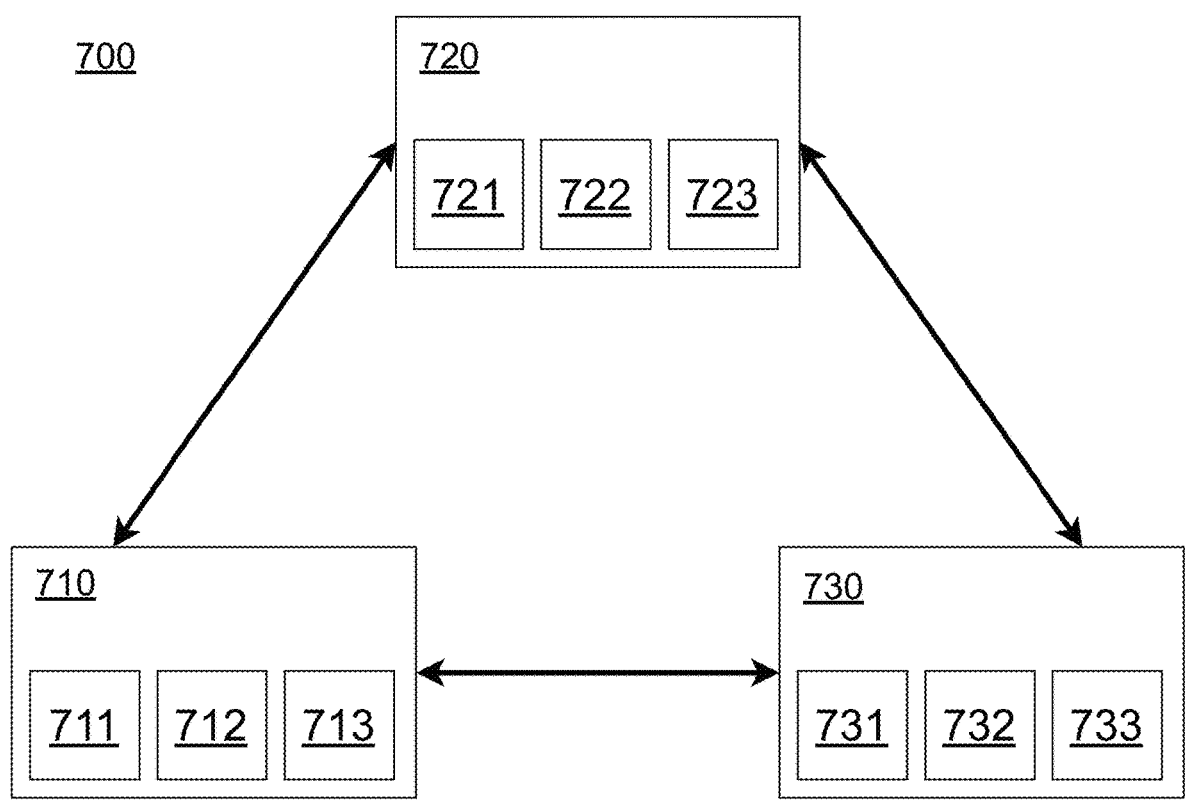
FIG. 7 illustrates a system according to some embodiments of the present disclosure.

FIG. 7 illustrates a system 700 according to some embodiments of the present disclosure. The system 700 may include a user terminal 710, a database 720, and a server terminal 730. The user terminal 710 may include a processor 711 and a memory 712. The memory 712 may store instructions or command to perform the procedures or operations of the present disclosure. The data base 720 may include a processor 721 and a memory 722. The memory 722 may store instructions or command to perform the procedures or operations of the present disclosure. The data base 730 may include a processor 731 and a memory 732. The memory 732 may store instructions or command to perform the procedures or operations of the present disclosure. In some embodiments, the user terminal 710, the data bases 720, and the server terminal 730 may further include communication units 713, 723, and 733 such that the user terminal 710, the data bases 720, and the server terminal 730 may communicate (e.g., transmit, receive, input, output, and access data) with each other.

In some embodiments, the user terminal 710 may access data from the data base 720 for a user's use (e.g., for a physician's use). For example, the user terminal 710 may access PVCT images from the data base 720 for a user's use. The user terminal 710 may transmit a request to the data base 720 such the data base 720 may transmit one or more images selected by the user terminal 710 to the server terminal 730 for further image processing or trigger origin prediction. In some embodiments, the user terminal 710 may transmit a request to the data base 720 such the data base 720 may transmit one or more images associated a patient selected by the user terminal 710 to the server terminal 730 for further image processing or trigger origin prediction.

When the server terminal 730 receives the request for image processing and the associated one or more images, the server terminal 730 may use each of the one or more images as an input image 101 (as shown in FIG. 1 or 3) and input each image to the image processing procedure 200 (as shown in FIG. 1 or 3) to perform image processing. In some embodiments, when the server terminal 730 receives the request for image processing and one or more images associated with the selected patient, the server terminal 730 may use the one or more images as input images 101 (as shown in FIG. 2) and input the one or more images to the image processing procedure 400 (as shown in FIG. 2) to perform image processing.

Through the image processing procedure 200, in response to each of the selected one or more images received from the data base 720, the server terminal 730 may generate outputs 301 and 302. Each of the outputs 301 and 302 may be a probability value. The sum of the outputs 301 and 302 may equal to 1. In some embodiments, one of the outputs 301 and 302 may indicate the probability that the input image 101 relates to a NPV trigger origin; the other of the outputs 301 and 302 may indicate the probability that the input image 101 relates to a PV trigger origin. In some embodiments, when the probability that input image 101 relating to a NPV trigger origin is greater than 0.5, the corresponding input image 101 may be determined as relating a NPV trigger origin.

Through the image processing procedure 400, in response to the one or more images of the selected patient received from the data base 720, the server terminal 730 may generate an output 501. The output 501 generated by the image processing procedure 400 may be a value indicating whether the one or more images of the selected patient is determined as relating to at least one NPV trigger origin. For example, when the output 501 equals to 1, the one or more images of the selected patient may be determined as relating to at least one NPV trigger origin. When the output 501 equals to 0, the one or more images of the selected patient may be determined as relating to at least one PV trigger origin. In some embodiments, when more than half of the one or more images of the selected patient received from the data base 720 are determined or predicted as relating to a NPV trigger origin, the output 501 may indicate the one or more images of the selected patient is determined or predicted as relating to a NPV trigger origin. When less than half of the one or more images of the selected patient received from the data base 720 are determined or predicted as relating to a NPV trigger origin, the output 501 may indicate the one or more images of the selected patient is determined or predicted as relating to a PV trigger origin.

The server terminal 730 may transmit the outputs (the output 301 and 302 or the output 501) to the database 720 and the user terminal 710. According to the output of the server terminal 730, the user of the user terminal 710 (e.g., physician) may determine whether the atrial fibrillation (e.g., paroxysmal atrial fibrillation) is caused by NPV trigger origins or PV trigger origins.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for image processing, including a processor and a memory. Computer programmable instructions for implementing a method for processing images are stored in the memory, and the processor is configured to perform the computer programmable instructions to implement the method for processing images. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for processing images as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

As used herein, the singular terms "a," "an," and "the" may include plural referents unless the context clearly indicates otherwise. For example, a reference to an electronic device may include multiple electronic devices unless the context clearly indicates otherwise.

As used herein, the terms "connect," "connected," and "connection" may refer to an operational coupling or linking. Connected components can be directly or indirectly coupled to one another through, for example, another set of components.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit, and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless otherwise specifically indicated herein, the order and grouping of the operations are not limitations of the present disclosure.

In order to further understand the present disclosure, some related reference documents are listed below.

[1] LeCun Y, Bengio Y, Hinton G. Deep learning. *Nature* 2015; 521: 436-44.

[2] Calkins H, Hindricks G, Cappato R, Kim Y H, Saad E B, Aguinaga L, et al. 2017 HRS/EHRA/ECAS/APHRS/SOLAECE expert consensus statement on catheter and surgical ablation of atrial fibrillation. Heart Rhythm. 2017; 14:e275-e444.

[3] Chen S A, Hsieh M H, Tai C T, Tsai C F, Prakash V S, Yu W C, et al. Initiation of atrial fibrillation by ectopic beats originating from the pulmonary veins: electrophysiological characteristics, pharmacological responses, and effects of radiofrequency ablation. Circulation. 1999; 100: 1879-86.

[4] Chang S L, Tai C T, Lin Y J, Wongcharoen W, Lo L W, Lee K T, et al. The role of left atrial muscular bundles in catheter ablation of atrial fibrillation. Journal of the American College of Cardiology. 2007; 50:964-73.

[5] McLellan A J, Ling L H, Ruggiero D, Wong M C, Walters T E, Nisbet A, et al. Pulmonary vein isolation: the impact of pulmonary venous anatomy on long-term outcome of catheter ablation for paroxysmal atrial fibrillation. Heart Rhythm. 2014; 11:549-56.

[6] Hof I, Chilukuri K, Arbab-Zadeh A, Scherr D, Dalal D, Nazarian S, et al. Does left atrial volume and pulmonary venous anatomy predict the outcome of catheter ablation of atrial fibrillation? Journal of cardiovascular electrophysiology. 2009; 20:1005-10.

[7] Abecasis J, Dourado R, Ferreira A, Saraiva C, Cavaco D, Santos K R, et al. Left atrial volume calculated by multi-detector computed tomography may predict successful pulmonary vein isolation in catheter ablation of atrial fibrillation. Europace. 2009; 11:1289-94.

[8] He K, Zhang X, Ren S, Sun J. Deep Residual Learning for Image Recognition. 2016 IEEE Conference on Computer Vision and Pattern Recognition (CVPR) 2016. p. 770-8.

[9] Ronneberger O, Fischer P, Brox T. U-net: Convolutional networks for biomedical image segmentation. International Conference on Medical image computing and computer-assisted intervention: Springer; 2015. p. 234-41.

[10] Mikolajczyk A, Grochowski M. Data augmentation for improving deep learning in image classification problem. 2018 International Interdisciplinary PhD Workshop (IIPhDW) 2018. p. 117-22.

[11] Cheng W H, Lo L W, Lin Y J, Chang S L, Hu Y F, Hung Y, et al. Ten-year ablation outcomes of patients with paroxysmal atrial fibrillation undergoing pulmonary vein isolation. Heart Rhythm. 2019; 16:1327-33.

[12] Tops L F, Schalij M J, den Uijl D W, Abraham T P, Calkins H, Bax J J. Image integration in catheter ablation of atrial fibrillation. Europace. 2008; 10 Suppl 3:iii48-56.

[13] Topol E J. High-performance medicine: the convergence of human and artificial intelligence. Nature medicine. 2019; 25:44-56.

[14] Hannun A Y, Rajpurkar P, Haghpanahi M, Tison G H, Bourn C, Turakhia M P, et al. Cardiologist-level arrhythmia detection and classification in ambulatory electrocardiograms using a deep neural network. Nature medicine. 2019; 25:65-9.

[15] Attia Z I, Kapa S, Lopez-Jimenez F, McKie P M, Ladewig D J, Satam G, et al. Screening for cardiac contractile dysfunction using an artificial intelligence-enabled electrocardiogram. Nature medicine. 2019; 25:70-4.

[16] Kwon J M, Lee Y, Lee Y, Lee S, Park J. An Algorithm Based on Deep Learning for Predicting In-Hospital Cardiac Arrest. Journal of the American Heart Association. 2018; 7.

[17] Kwon J M, Jeon K H, Kim H M, Kim M J, Lim S, Kim K H, et al. Deep-learning-based out-of-hospital cardiac arrest prognostic system to predict clinical outcomes. Resuscitation. 2019; 139:84-91.

[18] Zheng Y, Barbu A, Georgescu B, Scheuering M, Comaniciu D. Four-chamber heart modeling and automatic segmentation for 3-D cardiac CT volumes using marginal space learning and steerable features. IEEE Trans Med Imaging. 2008; 27:1668-81.

[19] Dormer J D, Ma L, Halicek M, Reilly C M, Schreibmann E, Fei B. Heart Chamber Segmentation from CT Using Convolutional Neural Networks. Proc SPIE Int Soc Opt Eng. 2018; 10578.

[20] Cardoso M J, Arbel T, Carneiro G, Syeda-Mahmood T, Tavares JMRS, Moradi M, et al. Deep Learning in Medical Image Analysis and Multimodal Learning for Clinical Decision Support2017.

[21] Chang H Y, Lo L W, Lin Y J, Chang S L, Hu Y F, Li C H, et al. Long-term outcome of catheter ablation in patients with atrial fibrillation originating from nonpulmonary vein ectopy. Journal of cardiovascular electrophysiology. 2013; 24:250-8.

[22] Shin S H, Park M Y, Oh W J, Hong S J, Pak H N, Song W H, et al. Left atrial volume is a predictor of atrial fibrillation recurrence after catheter ablation. J Am Soc Echocardiogr. 2008; 21:697-702.

[23] Hogarty D T, Mackey D A and Hewitt A W. Current state and future prospects of artificial intelligence in ophthalmology: a review. *Clinical & experimental ophthalmology*. 2018.

[24] Maxmen A. Deep learning sharpens views of cells and genes. *Nature*. 2018; 553:9-10.

[25] Ehteshami Bejnordi B, Veta M, Johannes van Diest P, van Ginneken B, Karssemeijer N, Litjens G, van der Laak J, Hermsen M, Manson Q F, Balkenhol M, Geessink O, Stathonikos N, van Dijk M C, Bult P, Beca F, Beck A H, Wang D, Khosla A, Gargeya R, Irshad H, Zhong A, Dou Q, Li Q, Chen H, Lin H J, Heng P A, Hass C, Bruni E, Wong Q, Halici U, Oner M U, Cetin-Atalay R, Berseth M, Khvatkov V, Vylegzhanin A, Kraus O, Shaban M, Rajpoot N, Awan R, Sirinukunwattana K, Qaiser T, Tsang Y W, Tellez D, Annuscheit J, Hufnagl P, Valkonen M, Kartasalo K, Latonen L, Ruusuvuori P, Liimatainen K, Albargouni S, Mungal B, George A, Demirci S, Navab N, Watanabe S, Seno S, Takenaka Y, Matsuda H, Ahmady Phoulady H, Kovalev V, Kalinovsky A, Liauchuk V, Bueno G, Fernandez-Carrobles M M, Serrano I, Deniz O, Racoceanu D and Venancio R. Diagnostic Assessment of Deep Learning Algorithms for Detection of Lymph Node Metastases in Women With Breast Cancer. *Jama*. 2017; 318:2199-2210.

[26] Kleppe A, Albregtsen F, Vlatkovic L, Pradhan M, Nielsen B, Hveem T S, Askautrud H A, Kristensen G B, Nesbakken A, Trovik J, Waehre H, Tomlinson I, Shepherd N A, Novelli M, Kerr D J and Danielsen H E. Chromatin organisation and cancer prognosis: a pan-cancer study. *The Lancet Oncology*. 2018; 19:356-369.

[27] Esteva A, Kuprel B, Novoa R A, Ko J, Swetter S M, Blau H M and Thrun S. Dermatologist-level classification of skin cancer with deep neural networks. *Nature*. 2017; 542:115-118.

[28] Lakhani P and Sundaram B. Deep Learning at Chest Radiography: Automated Classification of Pulmonary Tuberculosis by Using Convolutional Neural Networks. *Radiology*. 2017; 284:574-582.

[29] Titano J J, Badgeley M, Schefflein J, Pain M, Su A, Cai M, Swinburne N, Zech J, Kim J, Bederson J, Mocco J, Drayer B, Lehar J, Cho S, Costa A and Oermann E K. Automated deep-neural-network surveillance of cranial images for acute neurologic events. *Nature medicine*. 2018; 24:1337-1341.

[30] Abelson S, Collord G, Ng S W K, Weissbrod O, Mendelson Cohen N, Niemeyer E, Barda N, Zuzarte P C, Heisler L, Sundaravadanam Y, Luben R, Hayat S, Wang T T, Zhao Z, Cirlan I, Pugh T J, Soave D, Ng K, Latimer C, Hardy C, Raine K, Jones D, Hoult D, Britten A, McPherson J D, Johansson M, Mbabaali F, Eagles J, Miller J K, Pasternack D, Timms L, Krzyzanowski P, Awadalla P, Costa R, Segal E, Bratman S V, Beer P, Behjati S, Martincorena I, Wang J C Y, Bowles K M, Quiros J R, Karakatsani A, La Vecchia C, Trichopoulou A, Salamanca-Fernandez E, Huerta J M, Barricarte A, Travis R C, Tumino R, Masala G, Boeing H, Panico S, Kaaks R, Kramer A, Sieri S, Riboli E, Vineis P, Foll M, McKay J, Polidoro S, Sala N, Khaw K T, Vermeulen R, Campbell P J, Papaemmanuil E, Minden M D, Tanay A, Balicer R D, Wareham N J, Gerstung M, Dick J E, Brennan P, Vassiliou G S and Shlush L I. Prediction of acute myeloid leukaemia risk in healthy individuals. *Nature*. 2018; 559:400-404.

[31] Haissaguerre M, Jais P, Shah D C, Takahashi A, Hocini M, Quiniou G, Garrigue S, Le Mouroux A, Le Metayer P and Clementy J. Spontaneous initiation of atrial fibrillation by ectopic beats originating in the pulmonary veins. *The New England journal of medicine*. 1998; 339:659-66.

[32] Chen S A, Hsieh M H, Tai C T, Tsai C F, Prakash V S, Yu W C, Hsu T L, Ding Y A and Chang M S. Initiation of atrial fibrillation by ectopic beats originating from the pulmonary veins: electrophysiological characteristics, pharmacological responses, and effects of radiofrequency ablation. *Circulation*. 1999; 100:1879-86.

[33] Calkins H, Hindricks G, Cappato R, Kim Y H, Saad E B, Aguinaga L, Akar J G, Badhwar V, Brugada J, Camm J, Chen P S, Chen S A, Chung M K, Nielsen J C, Curtis A B, Davies D W, Day J D, d'Avila A, de Groot N, Di Biase L, Duytschaever M, Edgerton J R, Ellenbogen K A, Ellinor P T, Ernst S, Fenelon G, Gerstenfeld E P, Haines D E, Haissaguerre M, Helm R H, Hylek E, Jackman W M, Jalife J, Kalman J M, Kautzner J, Kottkamp H, Kuck K H, Kumagai K, Lee R, Lewalter T, Lindsay B D, Macle L, Mansour M, Marchlinski F E, Michaud G F, Nakagawa H, Natale A, Nattel S, Okumura K, Packer D, Pokushalov E, Reynolds M R, Sanders P, Scanavacca M, Schilling R, Tondo C, Tsao H M, Verma A, Wilber D J and Yamane T. 2017 HRS/EHRA/ECAS/APHRS/SOLAECE expert consensus statement on catheter and surgical ablation of atrial fibrillation. *Heart Rhythm*. 2017; 14: e275-e444.

[34] Hayashi K, An Y, Nagashima M, Hiroshima K, Ohe M, Makihara Y, Yamashita K, Yamazato S, Fukunaga M, Sonoda K, Ando K and Goya M. Importance of nonpulmonary vein foci in catheter ablation for paroxysmal atrial fibrillation. *Heart Rhythm*. 2015; 12:1918-24.

[35] Takigawa M, Takahashi A, Kuwahara T, Okubo K, Takahashi Y, Nakashima E, Watari Y, Yamao K, Nakajima J, Takagi K, Kimura S, Hikita H, Hirao K and Isobe M. Impact of Non-Pulmonary Vein Foci on the Outcome of the Second Session of Catheter Ablation for Paroxysmal Atrial Fibrillation. *Journal of cardiovascular electrophysiology*. 2015; 26:739-46.

[36] Lin W S, Tai C T, Hsieh M H, Tsai C F, Lin Y K, Tsao H M, Huang J L, Yu W C, Yang S P, Ding Y A, Chang M S and Chen S A. Catheter ablation of paroxysmal atrial fibrillation initiated by non-pulmonary vein ectopy. *Circulation*. 2003; 107:3176-83.

[37] Mohanty S, Trivedi C, Gianni C, Della Rocca D G, Morris E H, Burkhardt J D, Sanchez J E, Horton R, Gallinghouse G J, Hongo R, Beheiry S, Al-Ahmad A, Di Biase L and Natale A. Procedural findings and ablation outcome in patients with atrial fibrillation referred after two or more failed catheter ablations. *Journal of cardiovascular electrophysiology*. 2017; 28:1379-1386.

[38] Lo L W, Lin Y J, Chang S L, Hu Y F, Chao T F, Chung F P, Liao J N, Chiou C W, Tsao H M and Chen S A. Predictors and Characteristics of Multiple (More Than 2) Catheter Ablation Procedures for Atrial Fibrillation. *Journal of cardiovascular electrophysiology*. 2015; 26:1048-56.

[39] Cheng W H, Lo L W, Lin Y J, Chang S L, Hu Y F, Hung Y, Chung F P, Liao J N, Tuan T C, Chao T F, Tsai T Y, Liu S H and Chen S A. Ten-year ablation outcomes of patients with paroxysmal atrial fibrillation undergoing pulmonary vein isolation. *Heart Rhythm*. 2019; 16:1327-1333.

[40] He K, Zhang X, Ren S and Sun J. Deep Residual Learning for Image Recognition. 2016 *IEEE Conference on Computer Nsion and Pattern Recognition (CVPR)*. 2016:770-778.

[41] Mikolajczyk A and Grochowski M. Data augmentation for improving deep learning in image classification problem. 2018 *International Interdisciplinary PhD Workshop (IIPhDW)*. 2018:117-122.

[42] Moshkov N, Mathe B, Kertesz-Farkas A, Hollandi R and Horvath P. Test-time augmentation for deep learning-based cell segmentation on microscopy images. *bioRxiv*. 2019:814962.

[43] Chen Y J, Chen S A, Tai C T, Wen Z C, Feng A N, Ding Y A and Chang M S. Role of atrial electrophysiology and autonomic nervous system in patients with supraventricular tachycardia and paroxysmal atrial fibrillation. *Journal of the American College of Cardiology*. 1998; 32:732-8.

[44] Verma A, Jiang C Y, Betts T R, Chen J, Deisenhofer I, Mantovan R, Macle L, Morillo C A, Haverkamp W, Weerasooriya R, Albenque J P, Nardi S, Menardi E, Novak P and Sanders P. Approaches to catheter ablation for persistent atrial fibrillation. *The New England journal of medicine*. 2015; 372:1812-22.

[45] Santangeli P and Marchlinski F E. Techniques for the provocation, localization, and ablation of non-pulmonary vein triggers for atrial fibrillation. *Heart Rhythm*. 2017; 14:1087-1096.

[46] Tsai C F, Tai C T, Hsieh M H, Lin W S, Yu W C, Ueng K C, Ding Y A, Chang M S and Chen S A. Initiation of atrial fibrillation by ectopic beats originating from the superior vena cava: electrophysiological characteristics and results of radiofrequency ablation. *Circulation*. 2000; 102:67-74.

[47] Hung Y, Lo L W, Lin Y J, Chang S L, Hu Y F, Chung F P, Tuan T C, Chao T F, Liao J N, Walia R, Te A L D, Yamada S, Lin C H, Chang Y T, Lin C Y, Chan C S, Liao Y C, Raharjo S, Allamsetty S and Chen S A. Characteristics and long-term catheter ablation outcome in long-standing persistent atrial fibrillation patients with non-pulmonary vein triggers. *International journal of cardiology*. 2017; 241:205-211.

[48] Lin W S, Prakash V S, Tai C T, Hsieh M H, Tsai C F, Yu W C, Lin Y K, Ding Y A, Chang M S and Chen S A. Pulmonary vein morphology in patients with paroxysmal atrial fibrillation initiated by ectopic beats originating from the pulmonary veins: implications for catheter ablation. *Circulation*. 2000; 101:1274-81.

[49] Satoh T and Zipes D P. Unequal atrial stretch in dogs increases dispersion of refractoriness conducive to developing atrial fibrillation. *Journal of cardiovascular electrophysiology*. 1996; 7:833-42.

[50] Lee S H, Tai C T, Hsieh M H, Tsao H M, Lin Y J, Chang S L, Huang J L, Lee K T, Chen Y J, Cheng J J and Chen S A. Predictors of non-pulmonary vein ectopic beats initiating paroxysmal atrial fibrillation: implication for catheter ablation. *Journal of the American College of Cardiology*. 2005; 46:1054-9.

[51] Schauerte P, Scherlag B J, Patterson E, Scherlag M A, Matsudaria K, Nakagawa H, Lazzara R and Jackman W M. Focal atrial fibrillation: experimental evidence for a pathophysiologic role of the autonomic nervous system. *Journal of cardiovascular electrophysiology*. 2001; 12:592-9.

[52] AlTurki A, Marshall H J and Proietti R. Targeting nonpulmonary vein triggers during atrial fibrillation ablation: is the game worth the candle? *Current opinion in cardiology.* 2018; 33:50-57.
[53] Chang H Y, Lo L W, Lin Y J, Chang S L, Hu Y F, Li C H, Chao T F, Chung F P, Ha T L, Singhal R, Chong E, Yin W H, Tsao H M, Hsieh M H and Chen S A. Long-term outcome of catheter ablation in patients with atrial fibrillation originating from nonpulmonary vein ectopy. *Journal of cardiovascular electrophysiology.* 2013; 24:250-8.
[54] Zhao Y, Di Biase L, Trivedi C, Mohanty S, Bai R, Mohanty P, Gianni C, Santangeli P, Horton R, Sanchez J, Gallinghouse G J, Zagrodzky J, Hongo R, Beheiry S, Lakkireddy D, Reddy M, Hranitzky P, AI-Ahmad A, Elayi C, Burkhardt J D and Natale A. Importance of non-pulmonary vein triggers ablation to achieve long-term freedom from paroxysmal atrial fibrillation in patients with low ejection fraction. *Heart Rhythm.* 2016; 13:141-9.
[55] Mikolajczyk A, Grochowski M. Data augmentation for improving deep learning in image classification problem. Paper presented at: 2018 International Interdisciplinary PhD Workshop (IIPhDW); 9-12 May 2018, 2018.
[56] Calkins H, Hindricks G, Cappato R, et al. 2017 HRS/EHRA/ECAS/APHRS/SOLAECE expert consensus statement on catheter and surgical ablation of atrial fibrillation. Heart Rhythm Oct 2017; 14: e275-e444.

To further understand the present disclosure, more detail descriptions related to the present disclosure are provided below.

1. Automated Extraction of Left Atrial Volumes from Two-Dimensional Computer Tomography Images Using a Deep Learning Technique 1.1 Abstract Background: Precise segmentation of the left atrium (LA) in computed tomography (CT) images constitutes a crucial preparatory step for catheter ablation in atrial fibrillation (AF). We aim to apply deep convolutional neural networks (DCNNs) to automate the LA detection/segmentation procedure and create three-dimensional (3D) geometries.

Methods: Five hundred eighteen patients who underwent procedures for circumferential isolation of four pulmonary veins were enrolled. Cardiac C T images (from 97 patients) were used to construct the LA detection and segmentation models. These images were reviewed by the cardiologists such that images containing the LA were identified/segmented as the ground truth for model training. Two DCNNs which incorporated transfer learning with the architectures of ResNet50/U-Net were trained for image-based LA classification/segmentation. The LA geometry created by the deep learning model was correlated to the outcomes of AF ablation.

Results: The LA detection model achieved an overall 99.0% prediction accuracy, as well as a sensitivity of 99.3% and a specificity of 98.7%. Moreover, the LA segmentation model achieved an intersection over union of 91.42%. The estimated mean LA volume of all the 518 patients studied herein with the deep learning model was 123.3±40.4 ml. The greatest area under the curve with a LA volume of 139 ml yielded has a positive predictive value of 85.5% without detectable AF episodes over a period of one year following ablation.

Conclusions: The deep learning provides an efficient and accurate way for automatic contouring and LA volume calculation based on the construction of the 3D LA geometry.

Keywords: atrial fibrillation, deep learning, artificial intelligence, left atrium, segmentation.

Abbreviations

AF atrial fibrillation
AI artificial intelligence
AUC area under the curve
BSA body surface area
CCHIA Collaboration Center of Health Information Application
CFAE complex fractionated atrial electrogram
CI confidence interval
CNN convolutional neural network
CT computed tomography
DCNNs deep convolutional neural networks
HR hazard ratio
ICD International Classification of Disease
ILSVRC ImageNet Large Scale Visual Recognition Challenge
IoU intersection over union
LA left atrium
LV left ventricle
NPV non-pulmonary vein
PV pulmonary vein
PVCT pulmonary vein computed tomography
PVI pulmonary vein isolation
ReLU rectified linear unit
ROC receiver operating characteristics
2D two-dimensional
3D three-dimensional 1.2 Introduction Artificial intelligence (AI) is a specific field of computer science that aims to execute human-level cognitive tasks by emulating the human learning capacity, knowledge storage, and thought processes. Amount the advance techniques of AI, deep learning constitutes a rapidly developing technology that is capable of approximating highly complicated relationships among a massive amount of multivariate features, including unstructured data such as images.

The presence of atrial fibrillation (AF) will increase the risk of ischemic stroke by a factor of five times, heart failure by a factor of three times, and may lead to dementia and death. In the current era, circumferential pulmonary vein isolation (PVI) is the cornerstone of AF ablation. In previous investigations, the left atrium (LA) was shown to be the primary anatomic structure for the maintenance of AF. Many anatomic LA features have been investigated and correlated to clinical outcomes, and have been found particularly important for the prediction of AF recurrence after radiofrequency catheter ablation, including greater intervenous ridge lengths and larger LA volumes. In this study, we applied deep learning techniques for LA detection and segmentation of pulmonary vein computed tomography (PVCT) images. After the segmentation of the LA in each studied slice, the three-dimensional (3D) geometry was automatically created. The LA volume calculated based on the 3D geometry was quantified and correlated correlate with the clinical prognosis. Two deep convolutional neural networks (DCNNs) based on transfer learning techniques were established using different model architectures were established. Our study aims to achieve accurate segmentation of the LA based on the use of PVCT images with a pre-trained ResNet50 neural network classifier, and to depict the contours of the LA-based on a modified U-Net with preprocessed images.

1.3 Methods

This study was approved by the Institutional Review Board at Taipei Veterans General Hospital, Taipei, Taiwan (VGH-IRB Number: 2013-08-002AC #1), "Machine learning in predicting treatment and the impact of atrial fibrillation". The patient records/information was anonymous and de-identified prior to analysis.

1.3.1 Study Population and PVCT Datasets

Five hundred and eighteen patients were included in the study with symptomatic drug-refractory paroxysmal AF who received radiofrequency catheter ablation between May 1, 2005, and Nov. 30, 2017. This retrospective observational study was performed based on the analysis of the registry of PVCT at the Taipei Veterans General Hospital database. PVCT was performed before catheter ablation in all the studied patients. The indications for PVCT included the pre-operative assessment of patients with atrial fibrillation who were planned to undergo catheter ablation, and the evaluation of the LA. PVCT slices (with a thickness of 1-3 mm each, 20-200 slices for each patient, and a total of 38603 images for all 518 patients) were used in the deep learning process for LA detection and segmentation. All patients had sinus rhythms during scanning and during the end-diastolic LA phase. Based on the study of these patients, this phase appeared to have the largest LA volume, and was used for assessments.

Clinical variables, including past medical histories, risk factors, co-morbidities, and medications, were obtained from the medical records of the primary/secondary referral hospitals, outpatient visits, emergency visits, the Collaboration Center of Health Information Application (CCHIA), and the Ministry of Health and Welfare in Taiwan. The Ninth and Tenth Revisions of the International Classification of Disease (ICD-9 and ICD-10) codes were also used to identify the presence of underlying diseases, including diabetes mellitus, hypertension, coronary artery disease, heart failure, chronic kidney disease, liver disease, myocardial infarction, and valvular heart disease.

1.4 Deep Learning for LA Image Classification, Segmentation, and 3D Geometry Creation The details of PVCT training datasets and image preprocessing were described in the supplementary text (Supplementary Text—PVCT Training Datasets For LA Detection and Segmentation/Image Preprocessing).

1.4.1 Image Classification Model

For image classification, a convolutional neural network (CNN) was adopted as the fundamental image classification approach in this study by leveraging the transfer learning technique using the fastai library (version 1.0). In doing so, ResNet50, the winner of the 2015 ImageNet Large Scale Visual Recognition Challenge (ILSVRC), was selected as the base pretrained model. Accordingly, its initial feature extraction part was retained and its final classification part (in this case the last two layers) replaced with a customized deep neural network classifier. The classifier consisted of one set of concatenated average/maximum pooling layers, followed by a flatten layer and two sets of batch normalization, dropout, and linear transformation layers. In addition, two types of nonlinear activation functions, a rectified linear unit function (ReLU) and a log of SoftMax function, were respectively applied after the two linear transformation layers. In this way, the feature vector outputs from the base pretrained model were fed into the customized deep neural network classifier to yield binary predictions (i.e., with/ without the LA). For medical image analysis, this transfer learning approach using models pretrained on a massive number of other types of images (e.g., natural images) has the advantage of overcoming the often limited data volumes of medical images. Accordingly, it has been reported to be more accurate and robust compared to neural network models established afresh solely based on medical images.

The details of training techniques using data augmentation and optimization of learning rate to achieve a better performance of the deep learning model were described in the supplementary text (Supplementary Text—Data Augmentation and Optimization of Learning rate).

1.4.2 Image Segmentation Model

For image segmentation, a modified U-Net architecture in combination with transfer learning techniques was adopted to improve the performance of the typical U-Net architecture.

As in the case of image classification, data augmentation (random shifting, rotating, zooming, and/or flipping of the images) was applied to improve model generalizability. Moreover, as the image segmentation models target the prediction of fine-grained contours rather than the image categories, image deformation was further implemented to accelerate the generalizability of the model in this respect. The formula used for the evaluation of the predicted results in this study was the intersection over union (IoU), and was defined as the area of overlap over the area of union (Supplementary Text—The Model Training of LA Segmentation and IoU).

1.4.3 Step-by-Step Generation of LA Geometry with a Deep Learning Model

Figure 8:
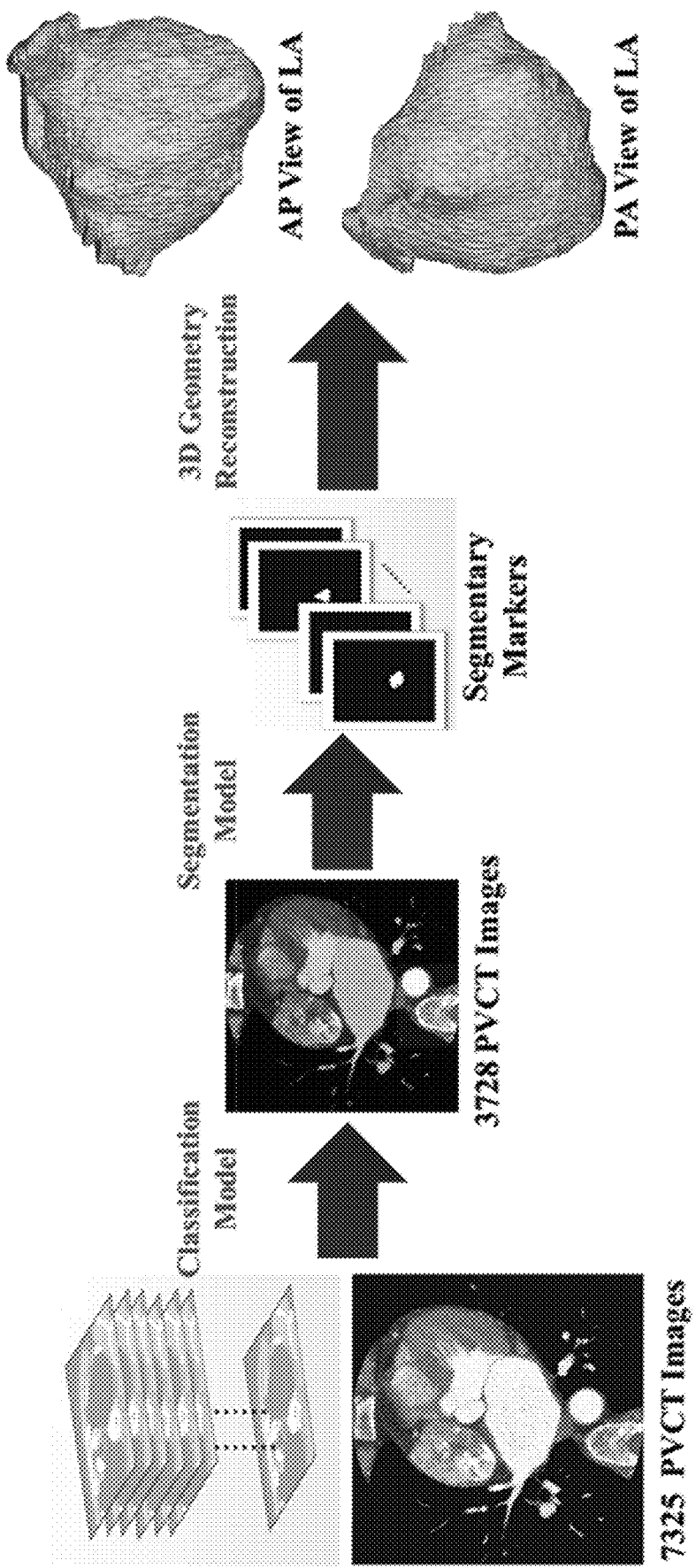
FIG. 8 illustrates the flowchart of the algorithm for LA (left atrium) classification, LA segmentation and 3D geometry creation by deep learning model.

After the setup of the LA classification and LA segmentation models, the generation of the 3D geometry of LA was efficient and time-saving. Firstly, PVCT images from 421 patients (total of 518 patients minus 97 patients used in the model training, validation, and testing groups) were input into the deep learning models to select the PVCT images which contained the LA. Secondly, among the selected PVCT images with LA, LA segmentation of each slice was carried out using the LA segmentation model. Finally, a 3D LA geometry was created based on the combination of all the two-dimensional (2D) PVCT slices with an interslice interval of approximately 1-3 mm. The formula of linear interpolation was used for the optimization of the 3D model geometry. The LA volume was calculated automatically after the construction of the 3D model of LA. The step-by-step algorithm for LA classification, LA segmentation, and LA 3D geometry creation, based on the use of deep learning approach, are shown in FIG. 8. FIG. 8 shows the flowchart of building 3D geometry of LA and LA segmentation by deep learning 1.4.4 AF Ablation After providing written informed consent, all patients underwent a standardized electrophysiological study which was performed in a fasting state. Prior to the electrophysiological study and ablation procedure, all antiarrhythmic agents except for amiodarone were withdrawn for at least five half-lives. The detailed procedure of catheter ablation employed in our patients has been described in detail previously.

1.4.5 Post-Ablation Follow-Up

The details of post-ablation follow-up were described in the supplementary text (Supplementary Text—Post-ablation Follow-up).

1.4.6 Statistical Analyses

Patient characteristics are expressed as mean f standard deviation for continuous variables, and as frequency (percentage) for categorical variables. Continuous and categorical variables were compared using the Student's t-test and the chi-square test with Yates' correction. Proportions were compared using the chi-square test or the exact Fisher test. Kaplan-Meier survival curve analyses with log-rank tests were applied to examine the survival in cases free from recurrence. Multivariate Cox proportional hazards regression included variables with P<0.1 on univariate analysis with results expressed as hazard ratios (HRs) with 95% confidence intervals (CIs). Statistical significance was set at P<0.05. Statistical analyses were performed using SPSS (version 18.0, SPSS Inc., Chicago, IL, USA).

1.5 Results 1.5.1 Baseline Characteristics of Studied Patients

The baseline characteristics of the studied patients are shown in Table 1. The mean age of the study population was 54.2±11.0 years, and 365 patients (70.5%) were male patients. All patients received circumferential isolation of all four pulmonary veins (PVs), 66 (12.7%) received additional LA linear ablation, and 20 (3.9%) patients received complex fractionated atrial electrogram (CFAE) ablation. Furthermore, non-pulmonary vein (NPV) triggers were present in 96 patients (18.5%). Table 1 shows the baseline characteristics of paroxysmal AF patients.

1.5.2 LA Image Segmentation

Overall, U-Net with pretrained models on the split dataset, displayed a faster convergence speed and an overall improved IoU than its non-transfer-learning counterpart. It is also notable that the IoU of the images with traditional data augmentation and deformation exceeded a 90% level (up to 91.4%) on the test set. The ground truth of LA segmentation and U-Net of LA segmentation are shown in FIG. 10.

Figure 10:
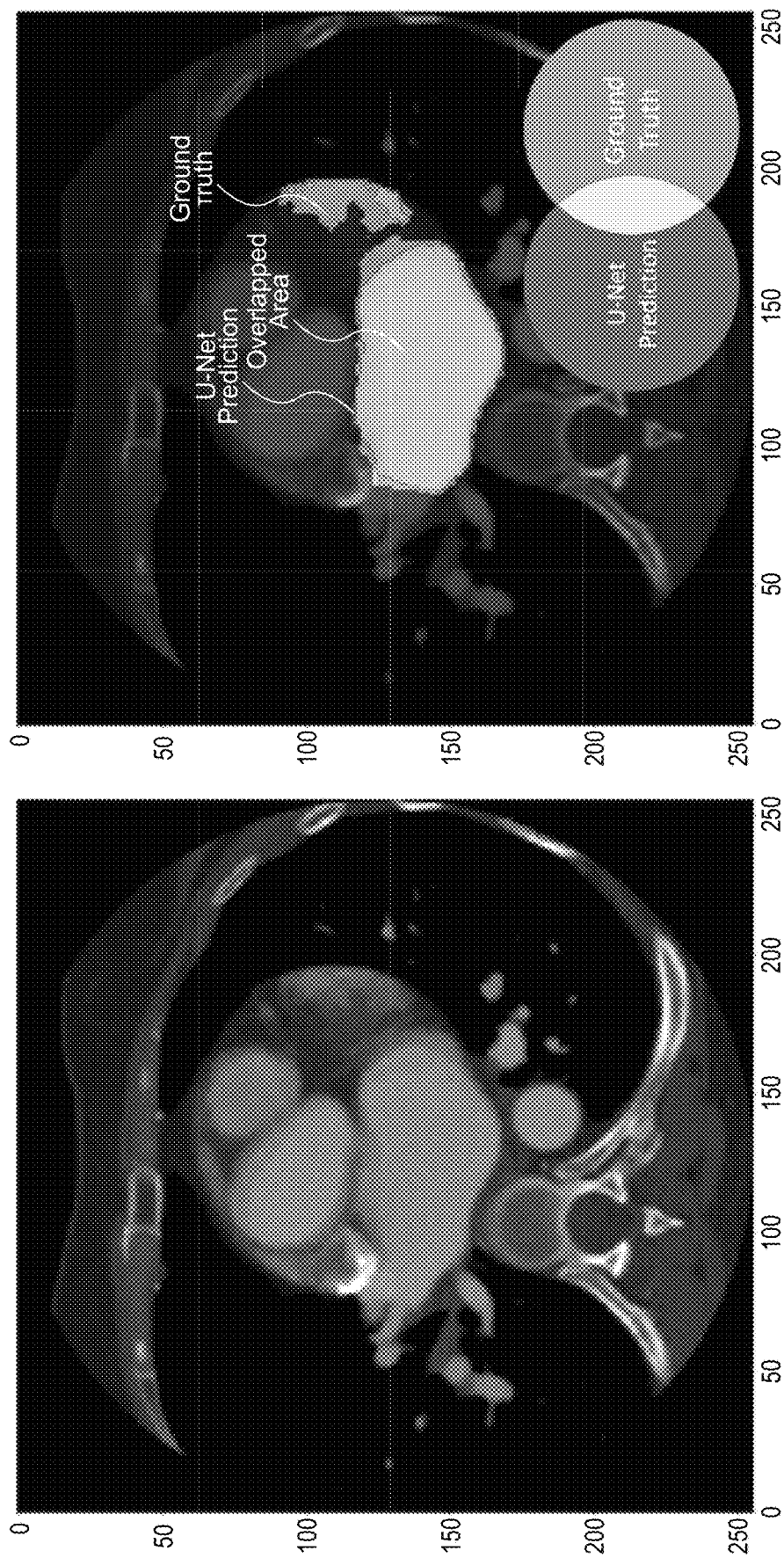
FIG. 10 illustrates the ground truth and U-Net LA segmentation.

FIG. 10 illustrates the ground truth and U-Net LA segmentation. The left part of FIG. 10 shows the cardiac image before contouring. The right part of FIG. 10 shows the cardiac image after contouring. One portion was the area associated with U-Net. Some portions are the area delineated as the ground truth. A large portion denotes the overlapping area and leads to an Intersection over Union (IoU) estimate of 91.4%.

TABLE 1

| Baseline characteristics | AF with recurrence (N = 254) | AF without recurrence (N = 264) | Total (N = 518) | P value |
|---|---|---|---|---|
| Age, years | 55.1 ± 10.8 | 53.4 ± 11.2 | 54.2 ± 11.0 | 0.082 |
| Men, n (%) | 188 (74.0) | 177 67.0) | 365 (70.5) | 0.082 |
| BMI (kg/m$^2$) | 25.2 ± 3.9 | 24.4 ± 4.5 | 24.8 ± 4.2 | 0.043 |
| BSA (m$^2$) | 1.82 ± 0.26 | 1.75 ± 0.29 | 1.78 ± 0.28 | 0.008 |
| HTN, n (%) | 121 (47.6) | 128 (48.5) | 249 (48.1) | 0.847 |
| Hyperlipidemia, n (%) | 73 (28.7) | 77 (29.2) | 150 (29.0) | 0.915 |
| DM, n (%) | 33 (13.0) | 30 (11.4) | 63 (12.2) | 0.571 |
| CAD, n (%) | 55 (21.7) | 49 (18.6) | 104 (20.1) | 0.380 |
| CHF, n (%) | 16 (6.3) | 4 (1.5) | 20 (3.9) | 0.005 |
| Old ischemic stroke/TIA, n (%) | 10 (3.9) | 5 (1.9) | 15 (2.9) | 0.166 |
| Hyperthyroidism, n (%) | 35 (13.8) | 32 (12.1) | 67 (12.9) | 0.574 |
| CHADS$_2$ | 0.9 ± 0.9 | 0.8 ± 0.9 | 0.8 ± 0.9 | 0.477 |
| CHA$_2$DS$_2$-VASc | 1.2 ± 1.1 | 1.1 ± 1.0 | 1.2 ± 1.0 | 0.483 |
| LA volume (ml) | 136.7 ± 46.0 | 110.3 ± 28.9 | 123.3 ± 40.4 | <0.001 |
| LA volume/BSA (ml) | 75.5 ± 26.9 | 62.1 ± 16.0 | 68.8 ± 23.0 | <0.001 |
| Echocardiographic parameters | | | | |
| LAD (mm) | 39.3 ± 6.3 | 36.7 ± 5.3 | 38.0 ± 5.9 | <0.001 |
| LVEF (%) | 59.6 ± 5.9 | 59.7 ± 6.8 | 59.7 ± 6.3 | 0.793 |
| NPV triggers, n (%) | 45 (17.7) | 51 (19.3) | 96 (18.5) | 0.639 |
| Repeat procedure | 66 (26.0) | 57 (21.6) | 123 (23.7) | 0.240 |
| Ablation procedures in index procedure | | | | |
| CFAE | 10 (3.9) | 10 (3.8) | 20 (3.9) | 0.930 |
| Linear ablation† | 43 (16.9) | 23 (8.7) | 66 (12.7) | 0.005 |

Values are numbers and percentage (%) of the variables ± standard deviation.
Abbreviations:
BMI, body mass index; BSA, body surface area; CAD, coronary artery disease; CFAE, complex fractionated atrial electrogram; CHF, chronic heart failure; DM, diabetes mellitus; HTN, hypertension; LA, left atrium; LAD, left atrial diameter; LVEF, left ventricular ejection fraction; NPV, non-pulmonary vein; TIA, transient ischemic attack.
†Linear ablation including LA roof line, mitral line, septal line and CS line.

1.5.2 LA Image Classification

Among the 518 patients, 5894 images from 77 patients were included in the training and validation groups for the LA classification model. A total of 20 patients and 1431 images were used for the test group. The training model of LA classification in the test group achieved an overall 99.0% accuracy, with an F1 score of 99.2%, a sensitivity rate of 99.3%, a specificity of 98.7%, a positive predictive value of 99.0%, and a negative predictive value of 99.0%. The confusion matrix for the final prediction results in the test group was shown in FIG. 9.

Figure 9:
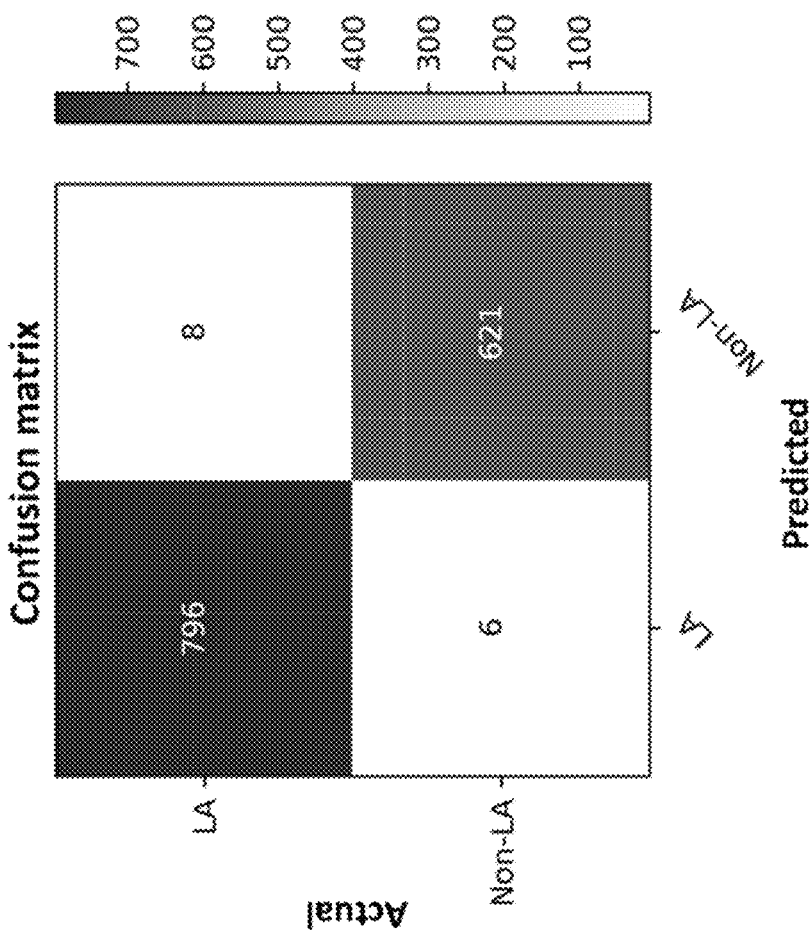
FIG. 9 illustrates the ROC (receiver operating characteristics) curve and the confusion matrix for the left atrial (LA) image classification.
Figure 9:
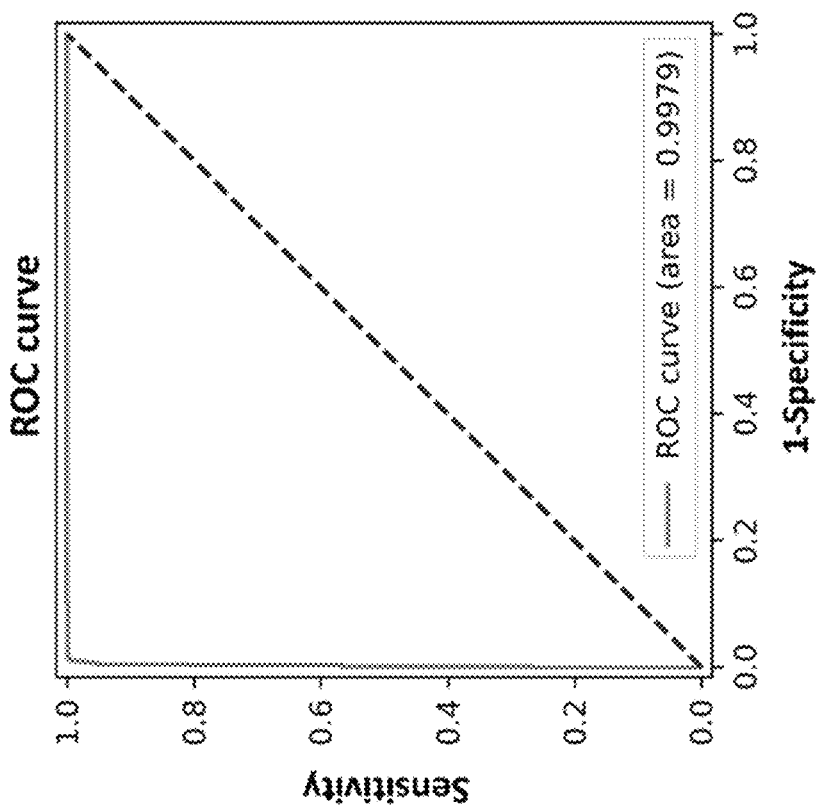

FIG. 9 illustrates the ROC (receiver operating characteristics) curve and the confusion matrix for the left atrial (LA) image classification. The results of confusion matrix delineated accuracy 99.0%, sensitivity 99.3%, specificity 98.7%, positive predictive value 99.0% and negative predictive value 99.0%.

Figure 11B:
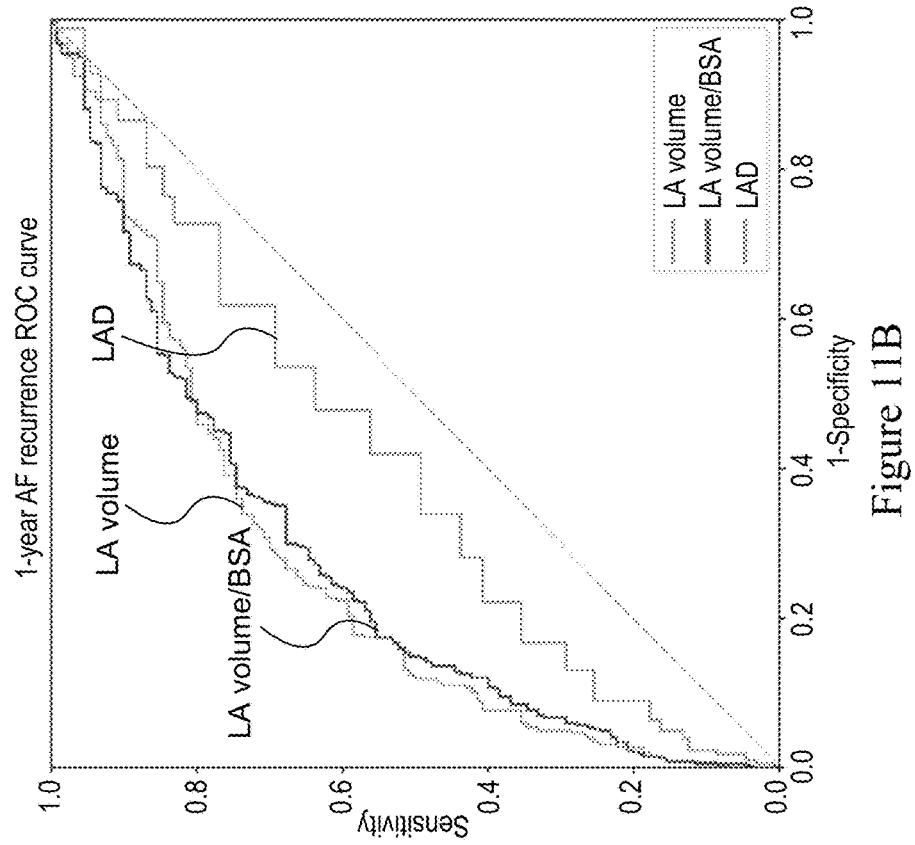
FIGS. 11A and 11B illustrate the plotted ROC curves of LA volume, normalized LA volume to BSA, and LA diameter for AF recurrence.
Figure 11A:
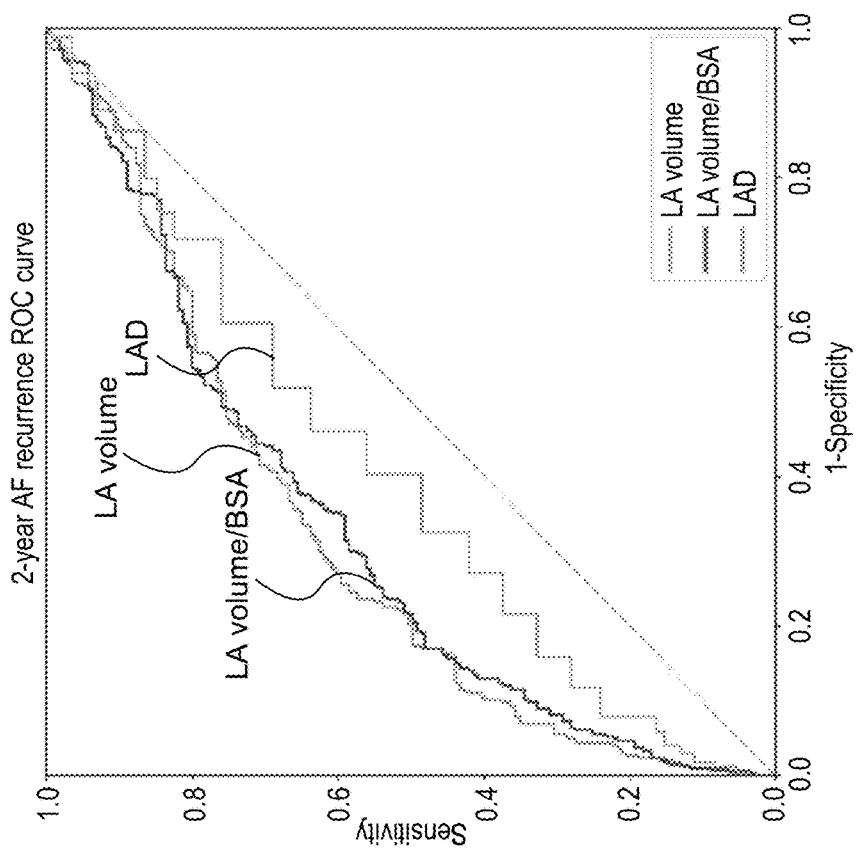

1.5.3 Step-by-Step Creation of LA Geometry by Deep Learning and Clinical Applications The automatically calculated mean LA volume from all 518 patients was 123.3 f 40.4 ml with deep learning based on the created 3D LA geometry. The receiver operating characteristics (ROC) curves were plotted for the LA volume and LA volumes normalized by the body surface area (BSA), which were estimated by multislice PVCT images, to predict post-ablation AF recurrence over periods of 1 and 2 years (The area under the curve [AUC] of prediction in AF recurrence with LA volume/[LA volume/BSA] over periods of 1 and 2 years were 0.742/0.736 and 0.696/0.684, respectively) (FIGS. 11A and 11B). A ROC curve is also plotted to show the LA diameter which was measured based on transthoracic echocardiographic data to predict post-ablation AF recurrence over periods of 1 and 2 years (the AUC of prediction in AF recurrence with LA diameters over periods of 1 and 2 years were 0.618 and 0.621, respectively) (FIGS.

11A and 11B). The LA volume had a better prediction rate for AF recurrence compared to the LA diameter. The best predictive power for LA volume occurred 1 year following the ablation, and it reduced in the second year after the procedure. The greatest AUC occurred for a LA volume of 139 ml. Patients with LA volumes less than this cut-off value of 139 ml yielded a positive predictive value of 85.5% in cases without detectable AF recurrent episodes after the ablation at one year of follow-up.

FIGS. 11A and 11B illustrate the plotted ROC curves of LA volume, normalized LA volume to BSA, and LA diameter for AF recurrence. FIG. 11A shows the ROC curves to predict AF recurrence after catheter ablation at one year of follow-up. The LA volume has the highest value of AUC of 0.742. FIG. 11B shows the ROC curves to predict AF recurrence after catheter ablation at two years of follow-up.

Figure 12B:
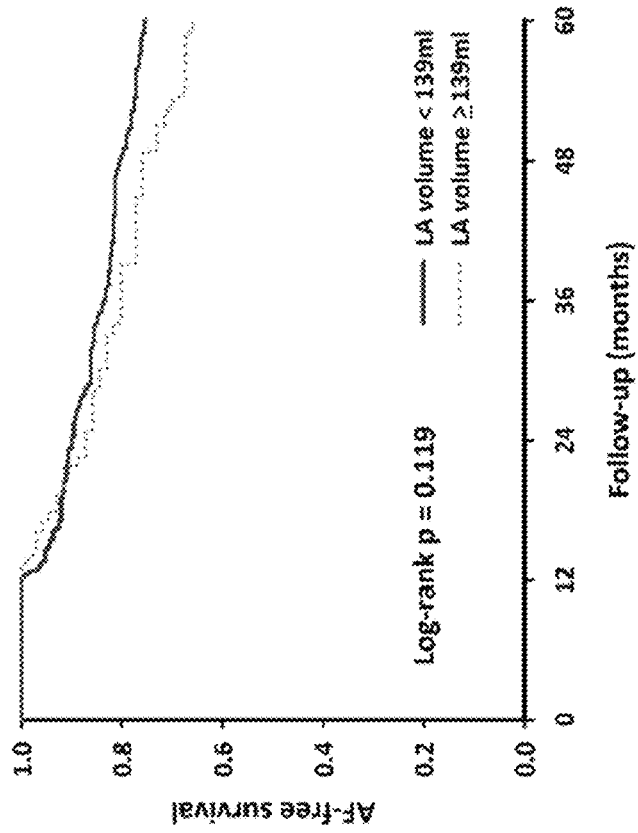
FIGS. 12A and 12B illustrate the plotted curves based on Kaplan-Meier analysis.
Figure 12A:
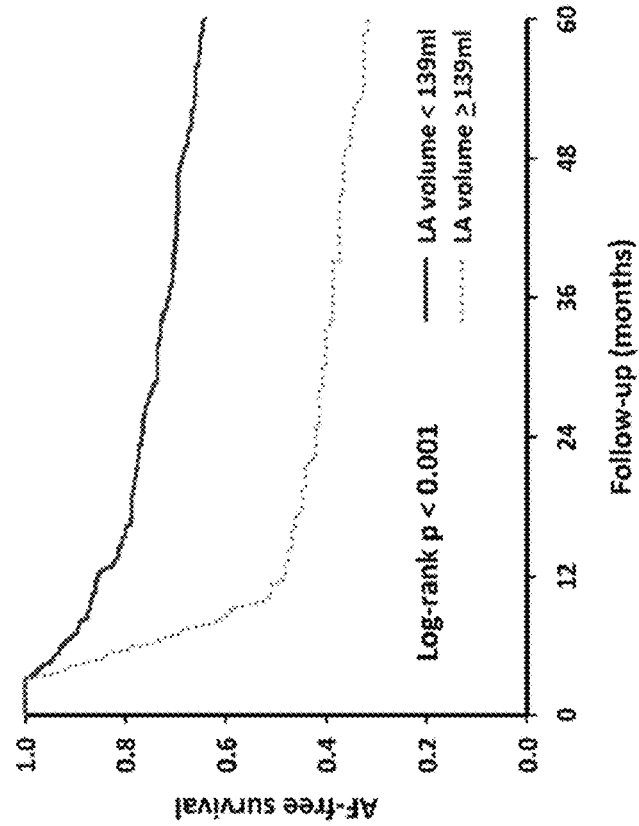

FIGS. 12A and 12B illustrate the plotted curves based on Kaplan-Meier analysis. FIG. 12A shows the Kaplan-Meier survival analysis showed that patients with LA volumes ≥139 ml were associated with a higher recurrence rate compared with patients with LA diameters <139 ml after the blanking period of the catheter ablation. FIG. 12B shows, among the patients who were recurrence-free 1 year after the procedure, the LA size was not a practically useful parameter for the prediction of recurrence that occurred 1 year later after the ablation.

1.5.4 Predictors of AF Recurrence

Based on multivariate logistic regression analysis, the LA volume ≥139 ml was an independent predictor of recurrence of AF (HR, 4.27; 95% CI, 2.99-6.11; P<0.001) during a one-year follow-up period. Detailed results of the univariate and multivariate Cox regression analyses are listed in Table 2. Table 2 shows the risk of 1-year AF recurrence in total patients and the patients with LA volume <139 ml.

TABLE 2

| | Univariate analysis | | | Multivariate analysis* | | |
|---|---|---|---|---|---|---|
| | Hazard ratio | 95% CI | P value | Hazard ratio | 95% CI | P value |
| Risk of 1-year AF recurrence in total patients | | | | | | |
| Age | 1.01 | 1.00-1.03 | 0.132 | | | |
| Male | 1.15 | 0.79-1.69 | 0.468 | | | |
| BMI | 1.06 | 1.01-1.11 | 0.015 | 1.02 | 0.95-1.10 | 0.558 |
| BSA | 2.30 | 1.06-5.02 | 0.036 | 1.35 | 0.45-4.05 | 0.591 |
| HTN | 1.17 | 0.83-1.65 | 0.366 | | | |
| DM | 1.03 | 0.61-1.74 | 0.915 | | | |
| CAD | 0.92 | 0.59-1.43 | 0.715 | | | |
| CHF | 1.53 | 0.71-3.27 | 0.278 | | | |
| Old ischemic stroke/TIA | 1.71 | 0.75-3.88 | 0.200 | | | |
| Hyperthyroidism | 1.28 | 0.80-2.04 | 0.304 | | | |
| NPV triggers | 1.26 | 0.84-1.91 | 0.267 | | | |
| $CHADS_2$ | 1.09 | 0.90-1.32 | 0.362 | | | |
| $CHA_2DS_2$-VASc | 1.14 | 0.97-1.33 | 0.112 | | | |
| Linear ablation | 1.73 | 1.11-2.70 | 0.015 | 1.33 | 0.85-2.09 | 0.210 |
| LA volume >139 ml | 4.44 | 3.13-6.29 | <0.001 | 4.27 | 2.99-6.11 | <0.001 |
| Risk of 1-year AF recurrence in patients with LA volume <139 ml | | | | | | |
| Age | 1.00 | 0.97-1.02 | 0.787 | | | |
| Male | 0.88 | 0.50-1.54 | 0.658 | | | |
| BMI | 1.00 | 0.93-1.06 | 0.892 | | | |
| BSA | 1.11 | 0.40-3.12 | 0.837 | | | |
| HTN | 0.77 | 0.44-1.34 | 0.356 | | | |
| DM | 0.90 | 0.39-2.10 | 0.805 | | | |
| CAD | 0.69 | 0.31-1.52 | 0.353 | | | |
| CHF | 0.51 | 0.07-3.67 | 0.501 | | | |
| Old ischemic stroke/TIA | 3.26 | 0.79-13.38 | 0.102 | | | |
| Hyperthyroidism | 0.89 | 0.38-2.07 | 0.782 | | | |
| NPV triggers | 1.05 | 0.53-2.08 | 0.899 | | | |
| $CHADS_2$ | 0.90 | 0.65-1.26 | 0.542 | | | |
| $CHADS_2 \geq 3$ | 3.17 | 1.14-8.79 | 0.026 | 2.88 | 1.03-8.02 | 0.043 |
| $CHA_2DS_2$-VASc | 1.01 | 0.77-1.33 | 0.922 | | | |
| Linear ablation | 0.83 | 0.35-1.93 | 0.657 | | | |
| LA volume | 1.01 | 1.00-1.03 | 0.095 | 1.01 | 1.00-1.02 | 0.130 |

†The multivariate regression model was calculated using multiple Cox regression stepwise analysis (included all variables with p <0.1).
The abbreviations are the same as Table 1.

The LA volume has the highest value of AUC of 0.696. Please see the context for a detailed description.

At a cutoff value of 139 mm identified by the ROC curve, the Kaplan-Meier survival analysis showed that patients with an LA volume of ≥139 ml were correlated with a higher recurrence rate after the blanking period compared with patients with an LA volume of <139 ml (FIG. 12A). However, the LA volume was not capable of predicting a recurrence that occurred 1 year later after the ablation (FIG. 12B).

In addition, for patients with LA volumes less than 139 ml, the $CHA_2DS_2$ score ≥3 (HR, 2.88; 95% CI, 1.03-8.02; P=0.043) was an independent predictor of the 1-year AF recurrence (shown in Table 2).

1.6 Discussion

1.6.1 Main Findings

Our deep learning model achieved an accuracy of 99.0% in LA identification and an IoU of 91.4% in LA segmentation. The deep learning approach provided an efficient and accurate way for automatic identification, contouring, and calculation of LA volumes based on the creation of the 3D LA geometry. The LA volume calculated by the deep learning network can independently predict the recurrence after the catheter ablation procedure for AF. The LA volume yielded the best prediction rate of AF recurrence within a period of 1 year following ablation. The LA volume (for values >139 ml) was an independent predictor for the 1-year AF recurrence. In addition, LA volumes <139 ml yielded a positive predictive rate of 85.5% in cases without detectable AF recurrent episodes through the 1-year follow-up after catheter ablation. Among patients with LA volumes <139 ml, the $CHA_2DS_2$ score ≥3 was an independent predictor of the 1-year AF recurrence.

1.6.2 Autodetection, Autosegmentation, and 3D LA Reconstruction

The reconstruction of the LA 3D geometry is critical for effective and safe catheter ablation. The coalescence of the LA geometry and electroanatomic mapping can help achieve circumferential PVI with better outcomes, reduce radiation exposure, and shorten the procedural time. For autodetection, autosegmentation and 3D LA geometry reconstruction applied to the PVCT images, the deep learning model is accurate, easily applicable, and time-saving in conjunction with the use of our deep learning model, and requires only a few minutes. It provides electrophysiologists with anatomical structures and positional variations to allow a precise understanding of the anatomical information, and facilitates successful ablation. Other than manual contouring of LA shapes, our AI model offers a more efficient way for image preparation.

1.6.3 Current Efforts on 3D LA Reconstruction

Artificial intelligence is a subfield of computer science that emulates human thought processes, learning ability, and knowledge storage. In the near future, deep learning will use a cascade of multiple processing layers of neurons to learn representations of data with multiple levels of abstraction. Deep learning is a novel machine-learning technique that plays an important role in fields such as image recognition (e.g., Facebook's facial recognition system), speech recognition (e.g., Apple's Siri), machine vision software in cameras, and in self-driven cars. In medical science, deep learning applications have been utilized for the detection of cardiac diseases with high accuracy, such as supraventricular tachycardia, atrial fibrillation, ventricular tachycardia, low-ventricular ejection fraction, and in-hospital or out-of-hospital cardiac death incidents.

In the current era, although a number of research groups succeeded to segment the four chambers of the heart from computed tomography (CT) images, their methods were not fully automated and required a deformation of a prior model or atlas. Accordingly, it is worth noting that because the cardiac anatomy varies considerably among individuals, it requires a nonrigid deformation. The development of segmentation algorithms is challenging owing to the tremendous variation of medical imaging data among individuals.

Additionally, there are still other types of methods which can be used to segment the heart from CT angiography data. For example, Dormer et al. recently used CNNs to segment the four cardiac chambers from CT images with an overall accuracy of 87.2±3.3%. Additionally, Cardoso et al. used full convolutional networks in combination with a statistical shape model to segment the LA and to separate the LA from the left ventricle (LV) in CT images. Although they achieved a Dice coefficient score >93%, their methods hinged on the application of additional shape constraints and image processing procedures, and were associated with a much more complicated model architecture than the current one.

1.6.4 LA Size and AF Recurrence after Catheter Ablation

LA size age, hypertension, sleep apnea syndrome, the type of AF, NPV triggers, and the substrate properties of the LA, have been reported to be associated with AF recurrence after ablation. Based on the currently available guidelines, the most reliable predictors of AF recurrence are the LA dimensions and PV anatomy. To-this-date, the LA volume is still considered as an important and independent factor for post-ablation detection of AF recurrence.

In previous studies, Shin et al. proposed that the LA volume threshold of 34 ml/m² by transthoracic echocardiography was an independent predictor of AF recurrence with a sensitivity of 70% and a specificity of 91%. Hof et al. also found that the LA volume was investigated to be an independent predictor of AF recurrence compared to PV anatomy with an adjusted odds ratio of 1.14 for every 10 ml increase in volume based on the evaluation of CT before ablation. Notably, LA volume was quantified based on manual tracings of the LA in 146 AF patients. In another study, Abecasis et al. reported that an LA volume of 145 ml was a good threshold for the prediction of AF prediction using semi-automatic software with the use of atrial endocardial contours in 165 patients with AF. The patients with LA volumes <145 ml had a 74% positive predictive value of success after catheter ablation, and were not associated with detectable AF recurrent episodes during the follow-up over a period of 16.7 f 6.6 months.

These studies showed the LA volume was an independent predictor of post-ablation AF recurrence even after multivariate analysis. In our study, we found that the LA volume was highly correlated with the 1-year recurrence after catheter ablation in AF. However, the prediction rate was decreased in the second year after ablation. At subsequent time periods, multiple factors could affect the risk of recurrence, rendering LA volume as a biomarker with a lesser impact on recurrence in the second year after ablation.

To the best of our knowledge, this is the first study that applies deep learning in automatic construction of the 3D LA geometry to investigate its correlation with clinical outcomes. Although there were multiple factors influencing AF recurrence after catheter ablation, the LA volume threshold of 139 ml was an independent predictor for AF recurrence. In addition, LA volumes <139 ml yielded a positive predictive rate of 85.5% in cases without detectable AF recurrent episodes during the 1-year follow-up period post-catheter ablation.

1.6.5 Clinical Implication

Our study inferred that LA volume measured based on the CT geometry was a better predictor in AF recurrence compared to the LA diameter obtained using transthoracic echocardiography. The automatic identification, contour of LA, and the construction of the 3D LA geometry based on our deep learning model yielded a higher accuracy in the prediction of AF recurrence owing to the PVCT images. Compared with previous studies, the creation of the LA geometry and the calculation of LA volume was a semi-automatic step. Our deep learning model provided a quick and effective way to automatically create the 3D LA geometry and quantify the LA volume in clinical practice. This could facilitate the process of catheter ablation, and would allow the prediction of AF recurrence.

1.6.6 Conclusions

The deep learning model constitutes an efficient and accurate approach for automatic contouring and calculation of LA volumes based on the formulation of 3D LA models. The LA volume measured by the deep learning model could predict AF recurrence after catheter ablation.

1.7 Supplementary Text—PVCT Training Datasets for LA Detection and Segmentation The PVCT images were saved in the digital imaging and communications in medicine (DICOM) format with a resolution of 512×512 pixels, and were retrospectively retrieved from the picture archiving and communication system (PACS) of the Taipei Veterans General Hospital after anonymization and following the approval of the hospital's institutional research board. The PVCT image datasets were respectively used to train models for LA detection (dataset 1, comprising data from 97 patients, amounting to 7,325 images in total) and LA segmentation (dataset 2, comprising data from 97 patients, amounting to 3,728 images in total). To establish the ground truth, these images were reviewed by the cardiologists such that the continuous series of images which contained the LA were labeled for each patient (a total of 3,728 images were identified to contain the LA) for dataset 1, and contours of the LA in the images were marked upon a corresponding mask image for dataset 2. The ground truth of the LA chamber was contoured in 97 patients for the training model by two cardiologists based on the exclusion of the pulmonary veins and the inclusion of the left atrial appendage (LAA). Images in each dataset were then divided into three subsets, including a training, a validation, and a test subset (62:15:20 patients for dataset 1 and dataset 2) for model training (Table 3). Table 3 shows the numbers of PVCT images in the training, validation, and test groups used for LA classification and LA segmentation models.

TABLE 3

|  | Training | Validation | Testing |
|---|---|---|---|
| LA classification model | | | |
| LA | 2431 | 493 | 804 |
| Non-LA | 2527 | 443 | 627 |
| Number of patients | 62 | 15 | 20 |
| LA segmentation model | | | |
| Number of images | 2431 | 493 | 804 |
| Number of patients | 62 | 15 | 20 |

1.8 Supplementary Text—Image Preprocessing

Before PVCT images were input to the deep learning model for training, they were first converted to numeric arrays with sizes of 512×512. As the range of values may vary from one image series to another owing to differences in scanner models/manufacturers, key DICOM tag information (e.g., "Rescale Intercept" and "Rescale Slope") was extracted from each image to normalize the pixel values to Hounsfield units (HU). To correct for occasional computer tomography (CT) metal artifacts which yield unreasonable HU values (beyond −1024 and 3071, e.g., −3829 or 62984) during the fast Fourier transform process at the initial PVCT image reconstruction stage, all pixel values with intensities smaller than −1024 were replaced with −1024 and those greater than 3071 were replaced with 3071. Additionally, to enhance the global image contrast, all PVCT images underwent histogram equalization and/or windowing, and pixel values were rescaled to the same range for each of the classification/segmentation models in this study.

1.9 Supplementary Text—Data Augmentation and Optimization of Learning Rate

In order to let the model learn more information and improve model generalizability, we applied data augmentation (rotating [in the range of −10 degrees to +10 degrees], zooming the images) to utilize to improve model generalizability in the training set. We confirmed the effect was be improved significantly after emphasizing the two methods of zooming and rotation by experiments.

In an initial training stage, layers in the base pretrained model were frozen and only the customized deep neural network classifier was trained until it was slightly overfitted. At a later stage, the layers in the base pretrained model were unfrozen and trained until overfitting was accomplished. To enhance the searching of an optimal local minimum in the weight space, cyclically restarting learning rates (also known as "stochastic gradient descent with restarts") were applied in both stages, with the learning rate gradually decaying from an "initial learning rate" over each cycle. The cycle length was set at one epoch during the initial stage, and increased at each subsequent epoch of the later stage to a value which was twice the length of the previous cycle. In addition, during the later training stage, the entire model was divided into three parts, and each was trained with a different "initial learning rate." For model training at the initial stage, the initial learning rate was set at 0.005. For model training at the later stage, the initial learning rate for the last part of the model was set at 0.005, and decreased to ⅓ of its initial value at the middle part, and to ⅑ of its initial value at the initial part. This was implemented based on the assumption that subsequent layers that extract more complicated, higher-level features, may require more fine-tuning than early layers that are in charge of more fundamental, lower-level features.

1.10. Supplementary Text—Model Training of Left Atrial Segmentation and Intersection over Union During actual model training, the weights of the feature extraction part of VGG-16 were frozen, and the remaining weights of the U-Net were trained in the expansion phase. Given that the mask values were either 0 or 1, making predictions on whether a pixel should be labeled as 0 or 1 is essentially a two-category classification problem. Thus, the common binary cross-entropy was adopted as the loss function. The definition is as follows, $$L(\theta) = -\frac{1}{n}\sum_{i=1}^{n}(y_i \log(p_i) + (1-y_i)\log(1-p_i)) \quad \text{Equation 1}$$

The formula used for the evaluation of the prediction outcome in this study is the intersection over union (IoU), and is defined as follows:

$$IoU = \frac{|A_{Target} \cap B_{prediction}|}{|A_{Target} \cup B_{Prediction}|} \quad \text{Equation 2}$$

The IoU formula always yields a value between zero and one. When the IoU value is close to zero, this means that the predicted result differs considerably from the ground truth. In addition, when the IoU is close to one, the predicted result is very similar to the ground truth. As each CT image corresponds to an IoU value, the average IoU across all images was used to evaluate the segmentation results.

1.11. Supplementary Text—Ablation Strategy in Paroxysmal AF

The catheter ablation of PVI was guided by a 3D-dimensional navigation system with a close (Chilli II, EPT, Boston Scientific Corporation, Natick, MA, USA) or an open (Cool Path or FlexAbility™ from St. Jude Medical, St. Paul, MN, USA, or ThermoCool from Biosense Webster, Irvine, CA, USA) irrigated tip ablation catheter. Radiofrequency power levels up to 25-35 W were deposited for 40 s for each lesion, with a target temperature below 40° C. Successful PV isolation was confirmed by obtaining the bidirectional block at the entrance and exit blocks of the PVs, absence of any electrical activity inside the PV, or dissociated PV activity during sinus rhythm. If the AF became organized, electro-anatomic mapping and radiofrequency ablation of linear ablation were performed to terminate the corresponding tachycardia. If AF was inducible after PVI, additional linear ablation or complex fractionated atrial electrogram (CFAE) ablation was performed. If AF still persisted after the completion of the aforementioned procedures, sinus rhythm was restored with external cardioversion. The location of the non-pulmonary vein (NPV) focus was evaluated after restoration to sinus rhythm during any step of the ablation procedure. In patients with NPV triggers, catheter ablation toward the earliest electrical activity, or a local unipolar QS pattern of the ectopic beat preceding the onset of AF were performed. The endpoint of the NPV trigger ablation was the disconnection between the superior vena cava (SVC) and right atrium (RA) between the coronary sinus (CS) and RA, and the elimination of other NPV ectopic beats with the negative provocation of AF. A RA cavotricuspid isthmus ablation was performed routinely with an 8 mm tip ablation catheter with a maximum power of 70 W and a temperature of 70° C. The achievement of the bidirectional conduction block following a linear ablation procedure was confirmed with sinus rhythm.

1.12. Supplementary Text—Post-Ablation Follow-Up

After discharge following the index ablation procedure, the patients were followed up at 2 weeks, and were then regularly monitored every 1 to 3 months at our cardiology outpatient clinic. Antiarrhythmic medications were prescribed for 4 to 8 weeks after the procedure to prevent the early recurrence of AF. The blanking period was defined to be less than 3 months after ablation. Follow-up with 24 h Holter monitoring or cardiac event monitoring for 1 week was performed regularly every 3 months after the ablation procedure and at any subsequent time in cases at which the patients experienced symptoms which suggested tachyarrhythmia. Long-term efficacy was assessed on the basis of a resting surface 12-lead electrocardiogram, 24 h Holter monitoring records, and/or cardiac event monitoring records which spanned 1 week. The clinical recurrence of AF was defined as the occurrence of arrhythmia which lasted longer than 30 seconds per episode after 3 months following the ablation procedure, according to the Heart Rhythm Society Task Force Consensus.[2]

2. the Clinical Application of the Deep Learning Technique for Predicting Trigger Origins in Paroxysmal Atrial Fibrillation Patients with Catheter Ablation 2.1 Abstract Background: Non-pulmonary vein (NPV) trigger has been reported as an important predictor of recurrence post atrial fibrillation (AF) ablation. Elimination of NPV triggers can reduce the post-ablation AF recurrence. The deep learning was applied in pre-ablation pulmonary vein computed tomography (PVCT) geometric slices to create a prediction model for NPV triggers in patients with paroxysmal atrial fibrillation (PAF).

Methods: We retrospectively analyzed 521 PAF patients who underwent catheter ablation of PAF. Among them, PVCT geometric slices from 358 non-recurrence AF patients (1-3 mm interspace per slice, 20-200 slices for each patient, ranging from the upper border of the left atrium to the bottom of the heart, for a total of 23683 images of slices) were used in the deep learning process, the ResNet34 of the neural network, to create the prediction model of the NPV trigger. There were 298 (83.2%) patients with only pulmonary vein (PV) triggers and 60 (16.8%) patients with NPV triggers+/−PV triggers. The patients were randomly assigned to either training, validation or test group and their data allocated according to those sets. The image datasets were split into training (n=17340), validation (n=3491), and testing (n=2852) groups, which had completely independent sets of patients.

Results: The accuracy of prediction in each PVCT image for NPV trigger was up to 82.4±2.0%. The sensitivity and specificity were 64.3f5.4% and 88.4±1.9%, respectively. For each patient, the accuracy of prediction for NPV trigger can achieve 88.6±2.3%. The sensitivity and specificity were 75.0±5.8% and 95.7±1.8%, respectively. The area under the curve (AUC) for each image and patient were 0.82±0.01 and 0.88±0.07, respectively.

Conclusions: The deep learning model using pre-ablation PVCT can be applied to predict the trigger origins in PAF patients receiving catheter ablation. The application of this model may identify patients with a high risk of a NPV trigger before ablation.

Keywords: atrial fibrillation, deep learning, artificial intelligence, trigger.

2.2 Introduction

In medical science, the application of deep learning approach of artificial intelligence (AI) has been utilized for exploring novel genotypes and phenotypes in existing diseases and for detecting diseases with high accuracies, such as cancers, stroke, tuberculosis and retinal diseases. The deep learning model has also been widely applied in image recognition to facilitate clinical practice.

Atrial fibrillation (AF) is mostly triggered by ectopy from pulmonary veins (PVs). Pulmonary vein isolation (PVI) has remained the cornerstone in catheter ablation of AF. Non-pulmonary vein (NPV) foci are also regarded as AF triggers. The presence of NPV triggers is a critical factor to cause AF recurrence after catheter ablation and elimination of NPV triggers could reduce this recurrence rate. It is safe and effective to apply radiofrequency energy catheter ablation in NPV foci to eliminate NPV triggers. Therefore, prediction of the NPV triggers before catheter ablation would provide important information to physicians and facilitate the ablation procedure. The aim of this study was to create a prediction model for NPV trigger origin, prior to catheter ablation, using the deep learning model from pre-ablation pulmonary vein computer tomography (PVCT) images in patients with paroxysmal AF.

2.3 Methods

This study was approved by the Institutional Review Board at Taipei Veterans General Hospital, Taipei, Taiwan (VGH-IRB Number: 2013-08-002AC #1), "Machine learning in predicting treatment and the impact of atrial fibrillation". The patient records and information were anonymous and de-identified prior to analysis.

2.3.1 Study Population

This retrospective, observational study was performed by analyzing the registry of PVCT at the Taipei Veterans General Hospital database.

A total of 1435 paroxysmal AF patients with pre-ablation PVCT images who underwent catheter ablation of AF between Oct. 1, 2004 and Dec. 31, 2017 were included in the database. Patients with 1) poor quality of the PVCT images checked independently by two electrophysiologists, 2) uncertain trigger origins during the ablation procedure and 3) patients lost at follow-up were excluded from the database. Five hundred and twenty-one paroxysmal AF patients with eligible pre-ablation PVCT images were randomly chosen from the database and included in the analyses. Three hundred fifty eight (68.7%) patients with no recurrence during the one-year follow-up post AF ablation were included in the analysis to develop the trigger prediction model. Only 12 (7.4%) patients with recurrence experienced re-do ablation, which did not allow a detailed investigation of the interaction between NPV trigger prediction and NPV ablation with respect to recurrence. We were unable to identify the mechanism for AF recurrence and therefore patients with AF recurrence after catheter ablation were not included in the analysis.

PVCT was performed before catheter ablation in every study patient. The indication for PVCT was preoperative assessment in patients with AF undergoing catheter ablation and an evaluation of the structure of the LA. All patients were in sinus rhythm during scanning and the phase corresponding with the end-diastole of the left atria. Based on the study of these patients, this phase appeared to have the largest LA volume for assessment.

Figure 13:
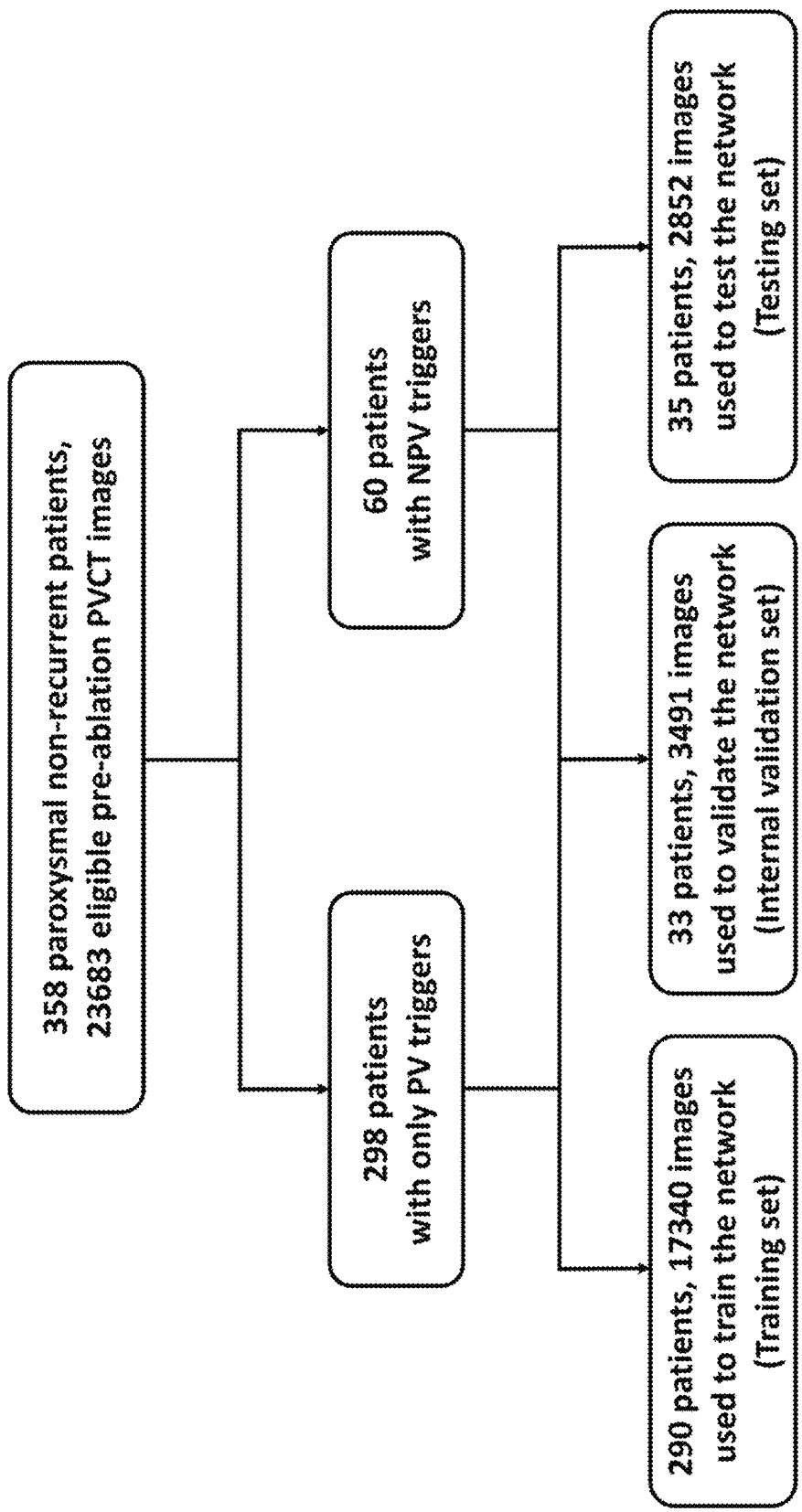
FIG. 13 illustrates an algorithm of patient enrollment in paroxysmal atrial fibrillation (AF) patients.

Patients without post-ablation recurrence of AF were divided into 2 groups. One consisted of 298 (83.2%) patients with only PV triggers, and the other consisted of 60 (16.8%) patients with NPV triggers with or without PV triggers group. The PVCT geometric slices (1-3 mm interspace per slice, 20-200 slices for each patient, ranging from the upper border of the left atrium to the bottom of the heart, for a total of 23683 images of slices in 358 non-recurrence AF patients) were used in the deep learning process for the prediction of NPV trigger origin. FIG. 13 shows the flowchart of patient enrollment in this study. FIG. 13 illustrates an algorithm of patient enrollment in paroxysmal AF patients.

The PV trigger was defined as an ectopic premature atrial beat within PVs which initiates AF. The NPV trigger was defined as an ectopic premature atrial beat other than PVs, which initiates AF. The clinical recurrence of AF was defined as any recurrence of AF lasting longer than 30 seconds per episode after 3 months since ablation, based on the Heart Rhythm Society Task Force Consensus.

Clinical variables, including past medical histories, risk factors, co-morbidities, and medications, were obtained from the medical records of the primary/secondary referral hospitals, outpatient visits, emergency visits, the Collaboration Center of Health Information Application (CCHIA), and the Ministry of Health and Welfare in Taiwan. The Ninth and Tenth Revision of the International Classification of Diseases (ICD-9 & ICD-10) codes were also used for identifying underlying diseases including diabetes mellitus, hypertension, coronary artery disease, heart failure, chronic kidney disease, liver disease, myocardial infarction, and valvular heart disease.

2.3.2 AF Ablation

After providing written informed consent, all patients underwent a standardized electrophysiological study performed in a fasting state. Prior to the electrophysiological study and ablation procedure, all antiarrhythmic agents except for amiodarone were withdrawn for at least five half-lives. The detailed procedure of catheter ablation employed in our patients has been described in detail previously. The catheter ablation of PVI was guided by 3-dimensional navigation system with a closed (Chilli II, EPT, Boston Scientific Corporation, Natick, MA) or an open (Cool Path or FlexAbility™ from St. Jude Medical, St. Paul, MN, USA; or ThermoCool from Biosense Webster) irrigated tip ablation catheter. Radiofrequency energy up to 25-35 W was applied for 40 seconds for each lesion, with a target temperature below 40° C. Successful PV isolation was confirmed by obtaining a bidirectional block, both the entrance and exit blocks of the PV, an absence of any electrical activity inside the PV, or dissociated PV activity during sinus rhythm. If the AF became organized, electro-anatomic mapping and radiofrequency ablation of linear ablation were performed to terminate the corresponding organized tachycardia. If AF was inducible after PVI, additional linear ablation or complex fractionated atrial electrogram (CFAE) ablation was performed. If AF persisted, sinus rhythm was restored by external cardioversion. The location of NPV focus was evaluated after restoration to sinus rhythm during any step of the ablation procedure. In patients with NPV triggers, catheter ablation toward the earliest electrical activity or a local unipolar QS pattern of the ectopic beat preceding the onset of AF was performed. The endpoint of the NPV trigger ablation was the disconnection between the superior vena cava (SVC) and right atrium (RA), as well as between the coronary sinus (CS) and RA, and elimination of other NPV ectopic beats with the negative provocation of AF. A right atrial cavotricuspid isthmus ablation was routinely performed with an 8-mm-tip ablation catheter with a maximum power of 70 W and a temperature of 70° C. The bidirectional conduction block of linear ablation was confirmed under sinus rhythm.

2.3.3 Image Processing

Data regarding rescale intercepts and slopes were initially extracted from corresponding tags in the DICOM files, based on which image values were standardized to Hounsfield Units (HU). The unsigned Dec value is 0 (+Rescale Intercept becomes −1024), so its padding pixel value is −1024. After subtraction of the padding pixels, the distribution of the image pixel values should not be lower than −1023. Pixel values between −1001~−1023 indicate the errors calculated by the CT instrument for the air HU. The highest error has a value of more than 3,000 since data acquisition only takes 12 bits (i.e., 4096 combinations of 0~4095) and, after adding the rescale intercept (−1024), the error mar range from −1024 to 3071. HU values less than −1024 and greater than 3071 were respectively replaced by −1024 and 3071 to correct for occasional artifacts generated during PVCT scanning or PVCT image reconstruction. Further, as different tissues are characterized by different ranges of HU (e.g., the HU value of water is around 0), choosing an appropriate pair of window width and window level may selectively highlight contours of different tissues. In the current study, to clearly present the complete cardiac contours, the window width was set at 1400 and the window level at 500. The PVCT images were rescaled using pixel values ranging from 0 to 255 and converted into PNG images. We tested multiple image processing techniques to enhance image features and validate the training performance of the model. Finally, we referred to the pre-processing of the Deep Residual Net (ResNet34) model to convert pixel values between 0 and 1, and the image size was set at 256×256 pixels before applying the model.

2.3.4 Deep Learning Model in Training/Validation/Test Sets

A total of 23683 slice images obtained from 358 patients were adopted and tested to develop an AF trigger model by using the deep learning process of PVCT geometric slices for the prediction of only PV or NPV+/−PV triggers. The patients were randomly assigned to either training, validation or test group and their data allocated according to those sets. Therefore, the image datasets were split into training (n=17340), validation (n=3491), and testing (n=2852) groups. The training, validation, and test datasets had completely independent sets of patients. The detailed numbers of datasets are shown in Table 5. Table 5 shows different types of data classification for model training in PVCT images.

TABLE 5

|  | Training | Validation | Testing |
|---|---|---|---|
| AF trigger model (PVCT images)* | | | |
| PV trigger | 15154 | 2417 | 2155 |
| NPV trigger | 2186 | 1074 | 697 |
| All | 17340 | 3491 | 2852 |
| AF trigger model (Patient numbers)† | | | |
| PV trigger | 253 | 22 | 23 |
| NPV trigger | 37 | 11 | 12 |
| All | 290 | 33 | 35 |

Values are numbers.
NPV, non-pulmonary vein; PV, pulmonary vein; PVCT, pulmonary vein computer tomography.
*Data was trained on the pre-trained ResNet34 model. The value was the number of images.
†We are using the fast.ai library which simplifies the fast and accurate training of neural nets using modern best practices. The number was counted as persons.

The ResNet of the neural network was the winner of the 2015 ImageNet Large Scale Visual Recognition Challenge (ILSVRC) and the verification of its validity in a large number of datasets has provided further support to the credibility of the model. The ResNet includes several versions (i.e., 18, 34, 50, 101, and 152) and the number indicates a different amount of layers. Overfitting is commonly observed in the application of deep learning methods and a version with a smaller number of layers and parameters was selected to achieve the best fit and produce acceptable results. The ResNet34 was selected as a pre-trained model and its framework was used to capture image features. The process to extract the key features includes the following steps: 1) low-level features were extracted using a 7*7 filter after entering the image into the model, 2) the low-level features were sequentially processed through six layers (3*3 filters and 64 channels), eight layers (3*3 filters and 128 channels), twelve layers (3*3 filters and 256 channels), and six layers (3*3 filters and 512 channels), which also allowed to extract high-level features. Low-level and high-level features of the images can be captured to train the model after repeated operations on the convolutional neural network.

Figure 14:
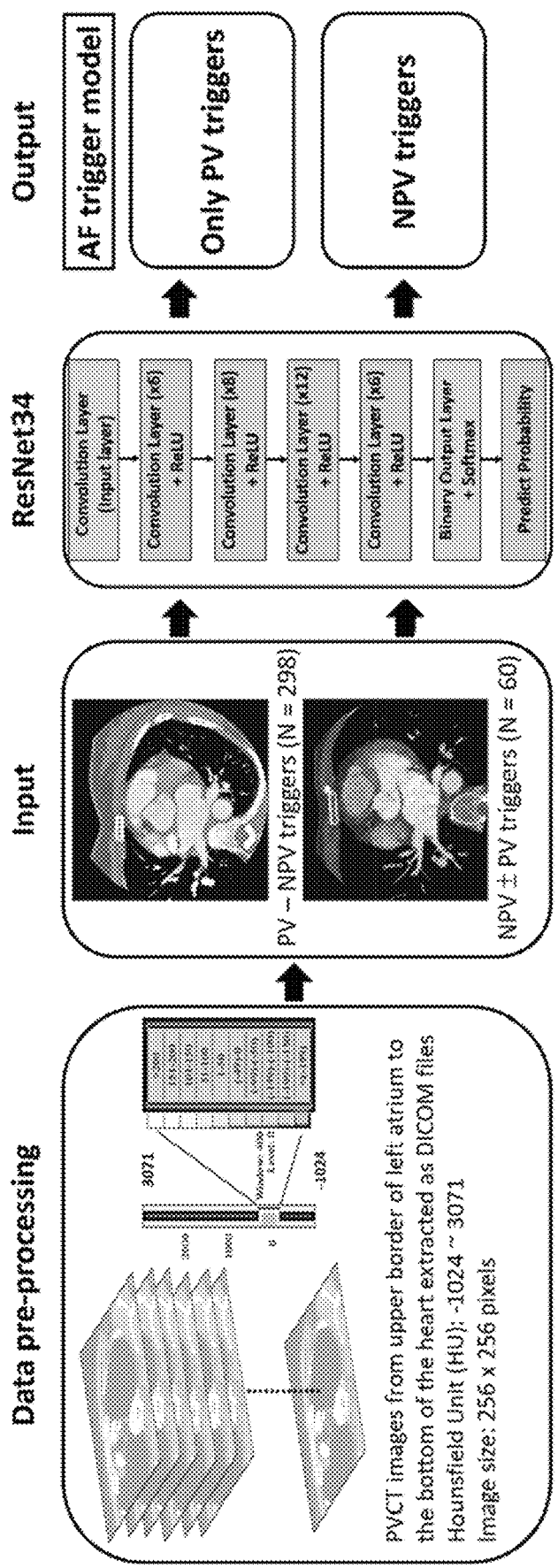
FIG. 14 illustrates a deep learning training process and mathematical operation.

The flowchart of the deep learning process is shown in FIG. 14. Every PVCT image output prediction was given as a probability. The output probability above 0.5 was considered as the NPV trigger. To produce a single prediction for the variable probability of all PVCT images in each patient, we used a majority vote of the predictions and we are able to conduct patient-wise receiver operator curve (ROC) analysis. For example, a patient had a total of 50 slices of PVCT images and each PVCT image had its own probability of NPV trigger. If the probability threshold of the PVCT image was greater than 0.5, the slice was classified as an NPV trigger. The deep learning model identified an NPV trigger in a patient if the total number of NPV triggers was greater than 50% of the total number of PVCT images.

The size of the heart was different between patients and, as a consequence, the number of slices analyzed in each patient was also different. The method of the majority vote of the predictions was applied to determine in each patient the probability of a single prediction for the variable related to all the PVCT images. This method is based on the analysis of the proportion of labeled NPV trigger relative to the total PVCT images to determine NPV trigger in each patient and it is not influenced by the size of the heart.

FIG. 14 illustrates a deep learning training process and mathematical operation. A total of 23683 PVCT images of slices from 358 patients (298 patients with only PV triggers and 60 patients with NPV triggers with or without PV triggers) undergone data pre-processing before training of the deep learning model. After data pre-processing, we input all the PVCT images in the ResNet34 of the neural network to train the deep learning model. Every PVCT image output prediction was given as a probability for PV trigger only or NPV trigger. Every PVCT image output prediction was given as a probability. The output probability above 0.5 was considered as the NPV trigger. The PV triggers only indicate PVCT images from patients who had the only PV trigger without any NPV trigger. The NPV triggers indicate PVCT images from patients who had NPV trigger with or without any PV trigger.

2.3.5 Imbalanced Datasets Management

The data was augmented to correct for imbalanced datasets in our AF trigger model. Data augmentation was applied (rotating by ±10 degrees or zooming the images) to improve model generalizability in the training database by allowing the model to learn more information. The zooming and rotation approaches improved the predictive performance significantly.

Test-time augmentation (TTA) was applied to the validation set and test databases, which is an approach similar to data augmentation. This technique involves creating multiple augmented copies of each image in the validation and test databases and allowing the model to make a prediction for each image. The prediction result is based on the calculation of the average probability for each prediction using different types of images. The predictions based on the augmented images can improve the predictive performance. In addition, image deformation is a common method of data augmentation, which was applied to increase the amount of database but, overall, it did not improve the predictive performance. The cardiac imaging in patients is characterized by different angles and shapes. The technique of data augmentation may change the relative position of each pixel in the PVCT image and complicate the identification of the original features. Hence, the image deformation method was not applied to our model.

2.3.6 Follow-Up Strategy

After discharge following the index ablation procedure, the patients were followed up at 2 weeks and then regularly every 1 to 3 months at our cardiology out-patient clinic. Antiarrhythmic medicines were prescribed for 4 to 8 weeks after the procedure to prevent the early recurrence of AF. The blanking period was defined as within 3 months after ablation.[11] Follow-up with 24-hour Holter monitoring or 1-week cardiac event monitoring was performed regularly every 3 months after the ablation procedure and at any time if the patients experienced symptoms suggestive of tachyarrhythmia. Long-term efficacy was assessed on the basis of resting surface 12-lead electrocardiograms, 24-hour Holter monitoring records, and/or 1-week cardiac event monitoring records.

2.3.7 Statistical Analysis

Statistical analyses were performed by SPSS statistical software, version 20.0 (SPSS, Inc., Chicago, IL, USA). Patient characteristics were expressed as mean±standard deviation (SD) for continuous variables, and percentages for categorical variables. Continuous and categorical variables were compared using the student's t-test and Pearson's chi-square test with Yates' correction, respectively. An alpha error of less than 5% was considered statistically significant. The bootstrap method was applied to repeatedly sample (>1000) the prediction results of the test database to calculate the ROC and area under the curve (AUC) and the respective 95% confidence intervals. The purpose of this technique was to evaluate the properties of the distribution in the test group.

2.4 Results 2.4.1 Baseline Characteristics

A total of 358 paroxysmal AF patients (age, 54.2±11.2 years; 243 [67.9%] male) with post-ablation non-recurrence were enrolled in this study, sixty (16.8%) of whom had NPV triggers. There were 29 (8.1%) patients with SVC triggers, 4 (1.1%) patients with left atrium free wall (LAFW)/left atrial appendage (LAA) triggers, 4 (1.1%) patients with CS triggers, 5 (1.4%) patients with RA/crista terminals triggers, 8 (2.2%) patients with inter-atrial septum (IAS) triggers and 12 (3.4%) patients with triggers from vein of Marshall. The baseline clinical characteristics in all patients are summarized in Table 6. Table 6 shows the baseline characteristics of the paroxysmal AF patients.

TABLE 6

| Baseline characteristics | Total (N = 358) |
|---|---|
| Age, years | 54.2 ± 11.2 |
| Men, n (%) | 243 (67.9) |
| BMI (kg/m$^2$) | 25.0 ± 3.3 |
| HTN, n (%) | 176 (49.2) |
| Hyperlipidemia, n (%) | 99 (27.7) |
| DM, n (%) | 41 (11.5) |
| CAD, n (%) | 73 (20.4) |
| CHF, n (%) | 11 (3.1) |
| Old ischemic stroke/TIA, n (%) | 6 (1.7) |
| Hyperthyroidism, n (%) | 41 (11.5) |
| CHADS$_2$ | 0.8 ± 0.8 |
| CHA$_2$DS$_2$-VASc | 1.2 ± 1.0 |
| NPV triggers, n (%) | 60 (16.8) |
| SVC, n (%) | 29 (8.1%) |
| LAFW/LAA, n (%) | 4 (1.1%) |
| CS, n (%) | 4 (1.1%) |
| RA/CT, n (%) | 5 (1.4%) |
| IAS, n (%) | 8 (2.2%) |
| VOM, n (%) | 12 (3.4%) |
| Echocardiographic parameters | |
| LAD (mm) | 37.5 ± 5.4 |
| LVEF (%) | 59.6 ± 6.2 |

Values are number and percentage (%) of the variables ± standard deviation.
AF, atrial fibrillation; BMI, body mass index; HTN, hypertension; DM, diabetes mellitus; CAD, coronary artery disease; CHF, chronic heart failure; TIA, transient ischemic attack; NPV, non-pulmonary vein; SVC, superior vena cava; LAFW/LAA, left atrium free wall/left atrium appendage; CS, coronary sinus; RA/CT, right atrium/crista terminalis; IAS, interatrial septum; VOM, vein of Marshall LAD, left atrial diameter; LVEF, left ventricular ejection fraction.

2.4.2 AF Trigger Origin Model Prediction

Multiple networks were tested, and the network that produced the highest AUC of the ROC for the validation data set was chosen. For each PVCT image, the AF trigger model testing experiment resulted in an accuracy rate of 82.4±2.0%, a sensitivity of 64.3±5.4% and a specificity of 88.4±1.9% for the predictive performance of the NPV trigger. For each patient included in the test experiment, the accuracy, sensitivity, and specificity rates were 88.6f2.3%, 75.0±5.8%, and 95.7±1.8% for the predictive performance of the NPV trigger, respectively. The ROC curves for each PVCT image and each patient are described in FIGS. 5A and 5B, and the AUCs were 0.82±0.01 and 0.88±0.07, respectively. The ROC curves for each PVCT image and each patient are described in FIGS. 5A and 5B. FIGS. 5A and 5B illustrate the ROC curves of testing results in the AF trigger origin model. FIG. 5A is illustrated for each PVCT image, in which the area under the curve (AUC)=0.82±0.01. FIG. 5B is illustrated for each patient, in which the AUC=0.88±0.07. The confusion matrices of testing results are shown in FIGS. 6A and 6B. FIG. 6A illustrates the confusion matrix of test results in PVCT images. FIG. 6B illustrates the confusion matrix of test results in all tested patients.

2.5 Discussion 2.5.1 Main Finding

Our study demonstrated that the deep learning approach of PVCT images provides the power to predict NPV triggers in patients with paroxysmal AF prior to catheter ablation. This would provide electrophysiologists additional information for decision-making before catheter ablation and facilitate the ablation procedure. Further multiple center trials are required to validate this deep learning model.

2.5.2 Previous Image Study for the Prediction of AF Trigger

PVs are structures coated by muscular sleeves, which extend from the LA; therefore, these muscular sleeves may have spontaneous pacemaker activity. PVI has become the cornerstone of catheter ablation approaches for eliminating AF PV foci. However, PVs are not the only trigger structures. The superior vena cava, coronary sinus, right crista terminalis, and ligament of Marshall are all structures which can act as NPV triggers. In our previous study, the incidence of NPV triggers was 16.4%, 20.4%, and 44.7% in paroxysmal, persistent, and long-standing persistent AF patients, respectively. Localization of NPV foci required a detailed analysis of mapping multipolar catheters and it can be time-consuming to identify the exact location of the NPV foci.

Our previous study investigated the structure of the PV by projections of PV angiography in patients with paroxysmal AF initiated by an ectopic PV trigger group, an NPV trigger group (triggers from SVC or crista terminalis) and a control group (patients without AF). The study demonstrated that patients with paroxysmal AF initiated by ectopic beats from superior PVs have greater ostia and proximal portion diameters of superior PVs than NPV triggers or control groups. The NPV trigger group also had a significantly dilated ostia of the superior PVs in comparison to the control group. However, the dilatation of the PVs was not correlated with the site of the ectopic beats that initiated AF. The mechanism by which this might be explained is that the rapid and chaotic firing of ectopic triggers within PVs causes a disorganized contraction of the muscle sphincters at the atriopulmonary venous junction and an increase in the dimensions of the atriopulmonary venous junction in addition to the delayed changes of structure similar to the LA. Similarly, increased stretch force attributed to the dilatation of PVs, which may change the electrophysiological characteristics of cardiac muscles within PVs and induce arrhythmia. These studies revealed the importance of image in the prediction of AF trigger.

2.5.3 Deep Learning in the Prediction of AF NPV Trigger Origins

NPV ectopic beats have played an important role in the initiation of PAF. However, whether there were predictors of NPV ectopic beats initiating the paroxysmal AF was still unclear. Our previous studies showed that female gender (p=0.043; OR 2.00, 95% CI 1.02 to 3.92) and left atrial enlargement (p=0.007; OR 2.34, 95% CI 1.27 to 4.32) could predict the presence of NPV ectopic beats. Schauerte et al. also reported that high-frequency stimulation of cardiac autonomic nerves in the vicinity of the canine SVC could induce SVC ectopy initiating paroxysmal AF, and this phenomenon could be abolished by atropine. These findings suggested that female gender, left atrial enlargement and higher parasympathetic activity might be associated with a higher incidence of NPV ectopic beats initiating AF. There is currently limited information on the predictors of NPV trigger and a predictive model of NPV triggers has not been validated. This study validated for the first time a prediction system of NPV trigger using a deep learning model. The model could be a useful tool to identify NPV triggers based on the prediction rate associated with PVCT images before catheter ablation and might ultimately help electrophysiologists to reduce post-ablation recurrence.

Figure 15:
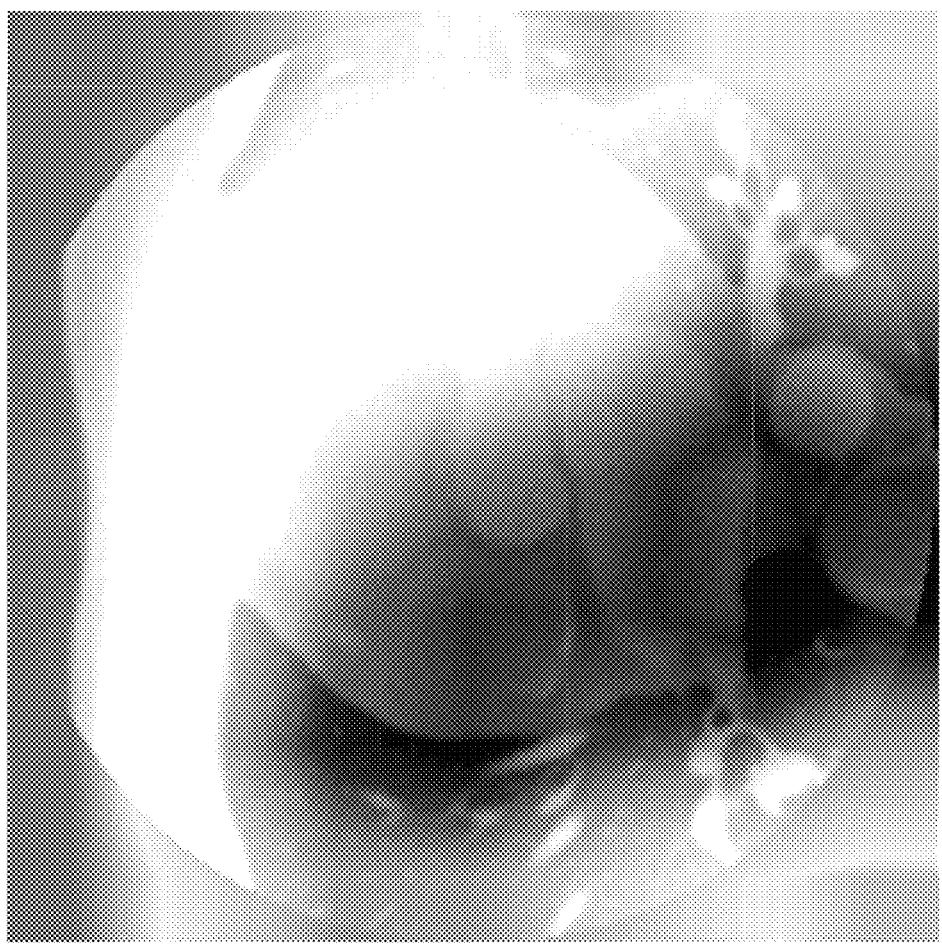
FIG. 15 is an example of discriminative localization delineating PVs, left and right atria in grad-CAM technique analysis for illustration of (artificial intelligence) AI explanatory power (interest area of AI).

The deep learning model does not provide algorithmic transparency; thus we were not capable of precisely realizing the algorithm's heuristic arrival at its final destination. In order to understand how the deep learning model assembles its understanding of images for trigger origin over multiple layers, we applied the grad-CAM technique for visualizing class-specific units to identify the judgment basis of the deep learning model on the PVCT images. We chose the population which received AF catheter ablation and in whom there was no recurrence after a one-year follow-up as the deep learning model. It indicated that we correctly eliminated all triggers during the catheter ablation procedure. In the deep learning model for PV or NPV foci in grad-CAM technique analysis, the hot spots gather in PVs and left and right atria in the prediction model (FIG. 15). It implied that the criteria for judgment by the deep learning model are the morphology, either size, shape or angle, of PVs and left and right atria. To the best of our knowledge, this is the first model predicting AF triggers using the deep learning approach.

Our deep learning model was created for the purpose of identifying possible NPV triggers in paroxysmal AF patients. The model has a high specificity for predicting NPV triggers, which could be useful for electrophysiologists to decide whether to conduct a detailed mapping and provocation tests during the procedure of catheter ablation. The sensitivity of the deep learning model might be improved by an increased sample size.

FIG. 15 is an example of discriminative localization delineating PVs, left and right atria in grad-CAM technique analysis for illustration of AI explanatory power (interest area of AI). The darkest spots (hot spots) in the deep learning trigger model for judgment of PV or NPV origin focus on right and left atria.

2.5.4 Clinical Implications

The NPV triggers were an independent predictor of AF recurrence and responsible for nearly half of the arrhythmia recurrence in patients requiring a repeat procedure. Elimination of mappable NPV foci during catheter ablation could reduce the AF recurrence rate and provide a better long-term outcome in paroxysmal AF patients. The successfully ablated NPV foci patients had AF-free outcomes equivalent to those with PV triggers in paroxysmal AF.

Our deep learning model could predict NPV triggers before a catheter ablation procedure through pre-ablation PVCT images. In this way, it increases the awareness of NPV triggers to physicians, which may facilitate the procedure and improve the AF outcome.

2.5.5 Study Limitations

A potential limitation of this study is that the analyses included subjects without AF recurrence within one-year follow-up post ablation. Although the ablation of NPV triggers was performed only when a reproducible focal trigger causing AF which was identified outside the PV ostia, we cannot exclude the possibility that some patients with NPV ablation may not have recurred if only PV ablation was conducted. The mapping and ablation techniques might have substantially changed between 2004 and 2017. However, our protocol for the provocation of NPV trigger during the AF procedure was similar in this period. We also analyzed patients without AF recurrence to ensure that electrophysiologists found a source of arrhythmia during the procedure and avoid the occurrence of any bias. The intensity of CT images during the training and testing steps and the intensity of PVs was not normalized, which may have resulted in an unequal enhancement of the right or left atria in each patient. The enhancement of the right or left atria may have provided additional information for the prediction of the deep learning model. The application of the technique for the normalization of CT image intensity might improve the performance of our model. Finally, not every PVCT slice carried information about NPV trigger leading to AF. PVCT images until the bottom of the heart were collected to include the anatomical structure of low right atrium or low crista terminalis, which were possible locations of AF triggers. In addition, both right and left atria were not segmented before the analysis of the deep learning model. The network may be detecting artifacts or messages outside the heart which might not have relevant information related to NPV triggers.

2.5.6 Conclusion

The deep learning approach using pre-ablation PVCT can be applied to predict AF trigger origins in paroxysmal AF patients receiving catheter ablation. The application of this model may identify patients with a high risk of NPV trigger before ablation.

We claim:

1. A method for processing pulmonary vein computed tomography (PVCT) images, comprising:
    obtaining a plurality of input PVCT images from the upper border of a left atrium to the bottom of a heart;
    determining, by a residual network model, whether each of the plurality of input PVCT images relates to a non-pulmonary vein (NPV) trigger origin, wherein a first convolution operation is performed based on the plurality of input PVCT images and a first convolution layer, and a second convolution operation is performed based on a second convolution layer, and
    determining the plurality of input PVCT images relating to a NPV trigger origin when more than half of the plurality of input PVCT images are determined relating to a NPV trigger origin,
    wherein:
        a first filter of the first convolution layer and a second filter of the second convolution layer are determined based on a training set and an internal validation set,
        the training set includes a first portion of the multiple patients and the corresponding training PVCT images,
        the internal validation set includes a second portion of the multiple patients and the corresponding training PVCT images, and
        the internal validation set determines whether the first filter of the first convolution layer and the second filter of the second convolution layer are convergent.

2. The method of claim 1, further comprising:
    obtaining a first input PVCT image of the plurality of input PVCT images;
    generating a first feature map by performing the first convolution operation based on the first input PVCT image and the first convolution layer, generating a second feature map by performing the second convolution operation based on the first feature map and the second convolution layer, generating a third feature map by adding the first feature map and the second feature map; and generating a first probability value based on the third feature map, the first probability value indicating a non-pulmonary vein (NPV) trigger origin.

3. The method of claim 2, wherein the first input PVCT image is determined relating to a non-pulmonary vein (NPV) trigger origin when the probability value is greater than 0.5.

4. The method of claim 2, wherein:
the first filter includes at least one first channel, and the second filter includes at least one second channel.

5. The method of claim 4, wherein the first filter of the first convolution layer and the second filter of the second convolution layer are determined based on a plurality of training PVCT images from multiple patients, and the multiple patients are without atrial fibrillation recurrence after a catheter ablation in a predetermined time period.

6. The method of claim 5, wherein the plurality of training PVCT images is obtained from the upper border of a left atrium to the bottom of a heart.

7. The method of claim 6, wherein some of the multiple patients are with pulmonary vein (PV) trigger origins, and the others of the multiple patients are with NPV trigger origins.

8. A apparatus for processing pulmonary vein computed tomography (PVCT) images, comprising:
a processor; and
a memory, which stores instructions causing the processor to perform operations, wherein the operations comprising:
inputting a plurality of input PVCT images from the upper border of a left atrium to the bottom of a heart;
determining, by a residual network model, whether each of the plurality of input PVCT images relates to a non-pulmonary vein (NPV) trigger origin, wherein a first convolution operation is performed based on the plurality of input PVCT images and a first convolution layer, and a second convolution operation is performed based on a second convolution layer;
determining the plurality of input PVCT images relating to a NPV trigger origin when more than half of the plurality of input PVCT images are determined relating to a NPV trigger origin; and
outputting an output indicating the plurality of input PVCT images relating to a NPV trigger origin,
wherein:
a first filter of the first convolution layer and a second filter of the second convolution layer are determined based on a training set and an internal validation set,
the training set includes a first portion of the multiple patients and the corresponding training PVCT images,
the internal validation set includes a second portion of the multiple patients and the corresponding training PVCT images, and
the internal validation set determines whether the first filter of the first convolution layer and the second filter of the second convolution layer are convergent.

9. The apparatus of claim 8, the operations further comprising:
inputting a first input PVCT image of the plurality of input PVCT images;
generating a first feature map by performing the first convolution operation based on the first input PVCT image and the first convolution layer;
generating a second feature map by performing the second convolution operation based on the first feature map and the second convolution layer,
generating a third feature map by adding the first feature map and the second feature map;
generating a first probability value based on the third feature map, the first probability value indicating a non-pulmonary vein (NPV) trigger origin; and
outputting the first probability value.

10. The apparatus of claim 9, wherein the first input PVCT image is determined relating to a non-pulmonary vein (NPV) trigger origin when the probability value is greater than 0.5.

11. The apparatus of claim 9, wherein:
the first filter includes at least one first channel, and the second filter includes at least one second channel.

12. The apparatus of claim 11, wherein the first filter of the first convolution layer and the second filter of the second convolution layer are determined based on a plurality of training PVCT images from multiple patients, and the multiple patients are without atrial fibrillation recurrence after a catheter ablation in a predetermined time period.

13. The apparatus of claim 12, wherein the plurality of training PVCT images is obtained from the upper border of a left atrium to the bottom of a heart.

14. The apparatus of claim 13, wherein some of the multiple patients are with pulmonary vein (PV) trigger origins, and the others of the multiple patients are with NPV trigger origins.

15. A non-transitory, computer-readable storage medium storing computer programmable instructions, the computer programmable instructions causing a computer to perform operations, the operations comprising:
inputting a plurality of input PVCT images from the upper border of a left atrium to the bottom of a heart;
determining, by a residual network model, whether each of the plurality of input PVCT images relates to a non-pulmonary vein (NPV) trigger origin, wherein a first convolution operation is performed based on the plurality of input PVCT images and a first convolution layer, and a second convolution operation is performed based on a second convolution layer,
determining the plurality of input PVCT images relating to a NPV trigger origin when more than half of the plurality of input PVCT images are determined relating to a NPV trigger origin; and
outputting an output indicating the plurality of input PVCT images relating to a NPV trigger origin,
wherein:
a first filter of the first convolution layer and a second filter of the second convolution layer are determined based on a training set and an internal validation set,
the training set includes a first portion of the multiple patients and the corresponding training PVCT images,
the internal validation set includes a second portion of the multiple patients and the corresponding training PVCT images, and
the internal validation set determines whether the first filter of the first convolution layer and the second filter of the second convolution layer are convergent.

16. The non-transitory, computer-readable storage medium of claim 15, the operations further comprising:
- inputting a first input PVCT image of the plurality of input PVCT images;
- generating a first feature map by performing the first convolution operation based on the first input PVCT image and the first convolution layer;
- generating a second feature map by performing the second convolution operation based on the first feature map and the second convolution layer;
- generating a third feature map by adding the first feature map and the second feature map;
- generating a first probability value based on the third feature map, the first probability value indicating a non-pulmonary vein (NPV) trigger origin; and
- outputting the first probability value.

17. The non-transitory, computer-readable storage medium of claim 16, wherein the first input PVCT image is determined relating to a non-pulmonary vein (NPV) trigger origin when the probability value is greater than 0.5.

18. The non-transitory, computer-readable storage medium of claim 16, wherein:
- the first filter of the first convolution layer and the second filter of the second convolution layer are determined based on a plurality of training PVCT images from multiple patients, and
- the multiple patients are without atrial fibrillation recurrence after a catheter ablation in a predetermined time period.

* * * * *